(12) United States Patent
Khalsa

(10) Patent No.: US 12,132,827 B1
(45) Date of Patent: Oct. 29, 2024

(54) SYSTEM AND METHOD FOR DOCUMENT SECURITY THAT CAN BE USED IN A VOTE PROCESS

(71) Applicant: Sundri Khalsa, East Boston, MA (US)

(72) Inventor: Sundri Khalsa, East Boston, MA (US)

( * ) Notice: Subject to any disclaimer, the term of this patent is extended or adjusted under 35 U.S.C. 154(b) by 0 days.

(21) Appl. No.: 18/537,864

(22) Filed: Dec. 13, 2023

Related U.S. Application Data

(60) Provisional application No. 63/505,597, filed on Jun. 1, 2023.

(51) Int. Cl.
| | |
|---|---|
| *H04L 29/06* | (2006.01) |
| *G06F 21/00* | (2013.01) |
| *G06K 19/06* | (2006.01) |
| *G07C 13/00* | (2006.01) |
| *H04L 9/08* | (2006.01) |
| *H04L 9/30* | (2006.01) |

(52) U.S. Cl.
CPC ...... *H04L 9/0838* (2013.01); *G06K 19/06037* (2013.01); *G07C 13/00* (2013.01); *H04L 9/30* (2013.01)

(58) Field of Classification Search
None
See application file for complete search history.

(56) References Cited

U.S. PATENT DOCUMENTS

| | | | | |
|---|---|---|---|---|
| 642,695 A * | 2/1900 | Hoyt | ...... | B42D 15/00 229/92.1 |
| 694,543 A * | 3/1902 | Green | ...... | G07C 13/02 235/57 |
| 5,640,647 A * | 6/1997 | Hube | ...... | H04N 1/00363 399/84 |
| 10,007,809 B1 * | 6/2018 | Douglis | ...... | H04L 9/0894 |
| 11,100,743 B1 * | 8/2021 | Sealy | ...... | G07C 13/00 |
| 2001/0034640 A1 * | 10/2001 | Chaum | ...... | G07C 13/00 705/12 |
| 2003/0145200 A1 * | 7/2003 | Eden | ...... | H04L 9/3247 713/161 |
| 2003/0158775 A1 * | 8/2003 | Chaum | ...... | G07C 13/00 705/12 |

(Continued)

OTHER PUBLICATIONS

Stan et al. "Architechting a scalable e-election system using Blockchain technologies", pp. 1-6 (Year: 2021).*

*Primary Examiner* — Lisa C Lewis
(74) *Attorney, Agent, or Firm* — Barry Choobin; Patent 360

(57) ABSTRACT

A system and method for voting including vote casting and vote counting. The system provides a paper ballot having a main section and a shreddable section. The main section includes a ballot ID, a ballot public key of a ballot public and private key pair, a set of voting options, and a machine-readable code at an end of the main section. The machine-readable code is configured to instruct a scanner device to stop scanning. The shreddable section includes a ballot private key of the ballot public and private key pair printed thereon. A scanner can read the information on the marked paper ballot, read the private key from the shreddable section, and shred the shreddable section. Scanner digitally signs image data using the ballot private key and scanner private key and applies "publicly solvable puzzle-based encryption" to the same. Scanner can transmit the encrypted image data to a blockchain server.

23 Claims, 10 Drawing Sheets

---

Template for a Paper Ballot (Not linked to a human identity)
[Folded and sealed in a tamper-evident way that conceals the ballot contents until the voter opens it in a private voting booth]

Main Section of Paper Ballot to be scanned to create a ballot image (~1 MB) or a ballot digital data pack (~5-25 KB):

- Ballot ID # (unique number, in human-readable machine readable (HRMR) format (from a sequenced set of numbers corresponding to the total number of registered/eligible voters), used to verify that the total number of cast ballots does not exceed the total number of registered/eligible voters.
- Ballot Public Key (unique number, in human-readable machine readable (HRMR) format, used to verify the authenticity of a scanned ballot image or a scanned ballot data file by validating its digital signature produced by the Ballot Private Key).
- *[The Ballot ID # and Ballot Public Key are published in a pre-election publication that lists all the Ballot ID#s and corresponding Ballot Public Keys for the upcoming election.]*
- ❑Typical content of a ballot (that can be read with Optical Mark Recognition (OMR) and Optical Character Recognition (OCR) technology).
- ❑Typical content of a ballot (that can be read with Optical Mark Recognition (OMR) and Optical Character Recognition (OCR) technology).
- Machine-readable code that instructs/triggers a scanner to stop creating an image or digital data pack of the main section and instead transition to reading the shreddable section of the paper ballot that contains the Ballot Private Key to create a digital signature.

Shreddable Section of Paper Ballot to be shredded: Ballot Private Key (unique number, in non-human-readable, machine-readable code/ format (such as a QR code), used to create a digital signature for the ballot image or digital data pack that is validated by the Ballot Public Key).

*[This section of the ballot containing the Ballot Private Key is never included in the ballot image (or digital data pack), is never published, and is shredded by the ballot-scanner-set assembly immediately after a voter runs the ballot through the scanner-set assembly, so it's impossible to later edit the paper ballot and re-scan and re-sign it with the Ballot Private Key.]*

(56) References Cited

U.S. PATENT DOCUMENTS

| | | | | |
|---|---|---|---|---|
| 2005/0138382 | A1* | 6/2005 | Hougaard | G06Q 10/10 |
| | | | | 713/176 |
| 2005/0228818 | A1* | 10/2005 | Murthy | G06F 40/143 |
| | | | | 707/999.102 |
| 2007/0095908 | A1* | 5/2007 | Haas | G07C 13/00 |
| | | | | 235/487 |
| 2007/0095909 | A1* | 5/2007 | Chaum | G07C 13/00 |
| | | | | 235/386 |
| 2008/0054074 | A1* | 3/2008 | Quine | B42D 15/08 |
| | | | | 235/487 |
| 2009/0078806 | A1* | 3/2009 | Adachi | B02C 18/2225 |
| | | | | 241/34 |
| 2010/0019036 | A1* | 1/2010 | Hawkins | G07C 13/00 |
| | | | | 235/386 |
| 2016/0371259 | A1* | 12/2016 | Kohlmeier | G06Q 10/10 |
| 2019/0266334 | A1* | 8/2019 | Robison | G06F 21/566 |
| 2020/0074464 | A1* | 3/2020 | Trevethan | G06Q 20/065 |
| 2020/0117690 | A1* | 4/2020 | Tran | G06F 16/90332 |
| 2020/0389292 | A1* | 12/2020 | Bartolucci | H04L 9/3247 |
| 2021/0158342 | A1* | 5/2021 | Bartolucci | H04L 9/0643 |
| 2021/0201614 | A1* | 7/2021 | Edwards | G06Q 40/02 |
| 2021/0211287 | A1* | 7/2021 | Roy | H04L 9/3236 |
| 2022/0210292 | A1* | 6/2022 | Pulitzer | G07C 13/02 |
| 2023/0151551 | A1* | 5/2023 | Kocher | B32B 3/266 |
| | | | | 162/124 |
| 2023/0282052 | A1* | 9/2023 | Ren | H04L 9/3252 |
| | | | | 235/54 R |
| 2024/0095709 | A1* | 3/2024 | Srivastava | G06V 10/761 |

\* cited by examiner

Template for a Paper Ballot (Not linked to a human identity)
[Folded and sealed in a tamper-evident way that conceals the ballot contents until the voter opens it in a private voting booth]

---

Main Section of Paper Ballot to be scanned to create a ballot image (~1 MB) or a ballot digital data pack (~5-25 KB):

- Ballot ID # (unique number, in human-readable machine readable (HRMR) format (from a sequenced set of numbers corresponding to the total number of registered/eligible voters), used to verify that the total number of cast ballots does not exceed the total number of registered/eligible voters.

- Ballot Public Key (unique number, in human-readable machine readable (HRMR) format, used to verify the authenticity of a scanned ballot image or a scanned ballot data file by validating its digital signature produced by the Ballot Private Key).

- [*The Ballot ID # and Ballot Public Key* are published *in a pre-election publication that lists all the Ballot ID#s and corresponding Ballot Public Keys for the upcoming election.*]

- ❑Typical content of a ballot (that can be read with Optical Mark Recognition (OMR) and Optical Character Recognition (OCR) technology).

- ❑Typical content of a ballot (that can be read with Optical Mark Recognition (OMR) and Optical Character Recognition (OCR) technology).

- Machine-readable code that instructs/triggers a scanner to stop creating an image or digital data pack of the main section and instead transition to reading the shreddable section of the paper ballot that contains the Ballot Private Key to create a digital signature.

---

Shreddable Section of Paper Ballot to be shredded: Ballot Private Key (unique number, in non-human-readable, machine-readable code/ format (such as a QR code), used to create a digital signature for the ballot image or digital data pack that is validated by the Ballot Public Key).

[*This section of the ballot containing the Ballot Private Key* is never included in the ballot image (or digital data pack), is never published, and is shredded *by the ballot-scanner-set assembly immediately after a voter runs the ballot through the scanner-set assembly, so it's impossible to later edit the paper ballot and re-scan and re-sign it with the Ballot Private Key.*]

Fig. 3

The Voting System's "Scalable Paper-Ballot-to-Blockchain Voting Kit" [to enable a *backup or primary* voting method using transparent, immutable, tamper-evident, decentralized digital ledgers—a set of blockchains]

State-Secured Polling Station

- Ballot Smart Printer (1 primary & 1 alternate per state)

- Folded, Sealed, Tamper-Evident Paper Ballots (with Ballot Private Keys—not linked to a human identity)

- Ballot-Scanner-Set-Assembly X (of 3 or more scanner pairs) [# sufficient for the # of voters expected to use a polling station]
  - Stakeholder X Ballot Scanner Pair X (Built by Vendor X—Chosen by Stakeholder X) [1 for each stakeholder]
    - Stakeholder-Transmitting-Ballot Scanner [with outbound unidirectional data diodes at data ports that only permit data to *exit* (not *enter*) the scanner]
    - Stakeholder-Green-Light Verifying-Ballot Scanner [with inbound unidirectional data diode at data port that only permits data to *enter* (not *exit*) the scanner]

- Stakeholder-Bidirectional/TCP-Outbound-Relay Computer [1 for each stakeholder]
  - Modems (without a Router) to Multiple Traditional Internet ISPs [≥3 for each relay computer]

- Stakeholder-Unidirectional/UDP-Outbound-Relay Computer [1 for each stakeholder]
  - Transmitting UHF/VHF/HF Radio Antennas
  - Modems (without a Router) to Multiple Satellite Internet ISPs
  - Satellite Antennas to Multiple Satellite Internet Networks One of three types of outbound and inbound data paths that provides redundancy in case of failures or censorship on the other paths

- Stakeholder-Bidirectional/TCP-Inbound-Relay Computer [1 for each stakeholder]
  - **Modem (with a Router) to Satellite Internet Configured for *Inbound* Data Only**
  - **Receiving UHF/VHF/HF Radio Antennas Configured for *Inbound* Data Only**
  - **Modem (with a Router) to Traditional Internet Configured for *Inbound* Data Only**

**Modems (with a Router) to Traditional Internet Configured for *Inbound & Outbound* Data**

Stakeholder-Ballot-Blockchain-Display Computers or Permitted Use of Personal Devices/Phones (Outside the Voting Booths)

---

- A third party Blockchain Database or a layer-2 sidechain database of the Bitcoin Blockchain Database

- Stakeholder-Ballot-Blockchain-Builder (Sequencer) Computers

- Stakeholder-Ballot-Blockchain Server [1 for each stakeholder]
  - Ballot-Blockchain-Display Websites/Computers (owned by the public or the stakeholders) [Unlimited #]
  - Ballot-Blockchain-Validator Computers (owned by the public or the stakeholders) [Unlimited #]
  - Public-Ballot-Blockchain-Builder (Sequencer) Computers

Fig. 4

Stakeholder Blockchain of Ballots: "Stakeholder Ballot Blockchain"
[Two Types: Ballot Blockchain of *Ballot-Image-Data-Hash Packs* (*BIDHPs*) or Ballot Blockchain of *Ballot-Data-Hash Packs* (*BDHPs*)]
[Each *Stakeholder Ballot Blockchain* has all *Ballot-Image-Data-Hash Packs* (*BIDHPs*) or all *Ballot-Data-Hash Packs* (*BDHPs*), and they are sequenced in order of receipt to their corresponding blockchains]

Block 1 Data (~1 MB if BDHIP or ~5 KB if BDHP)
- Decrypted, validated BIDHP-1 or BDHP-1, digitally signed by the Ballot Private Key and a Stakeholder Scanner Private Key
  - Marked Ballot 1 ID# (published before the election, *not* linked to a human identity)
  - Marked Ballot 1 Public Key (published before the election)
  - Marked Ballot 1 scanned image (created by a stakeholder-transmitting scanner) [**only included on a *BIDHP* blockchain, not a *BDHP* blockchain**]
  - Marked Ballot 1 scanned image hash (created by a stakeholder-transmitting scanner using a designated open-source cryptographic hash function that enables all stakeholders and the public to verify that the ballot image and the ballot-image hash pass a data match check)
  - Marked Ballot 1 voter selection data (read and recorded by a stakeholder-transmitting scanner)
  - Digital signatures/hashes of BIDHP/BDHP-1 (created by a stakeholder-transmitting scanner using the Ballot Private Key and the Scanner Private Key, which all other stakeholders and the public can verify using the Ballot Public Key and the Scanner Public Key that were published before the election)
- BIDHP/BDHP-1 Cryptographic Puzzle Solution (Decryption Key) (calculated by a blockchain builder computer to decrypt the BIDHP/BDHP after a transmitting scanner used the cryptographic puzzle to encrypt the BIDHP/BDHP to prevent keyword censorship of the BIDHP/BDHP during its transit over the internet to the blockchain builder computer)
- (Genesis block, so no unique signature/hash from previous block)

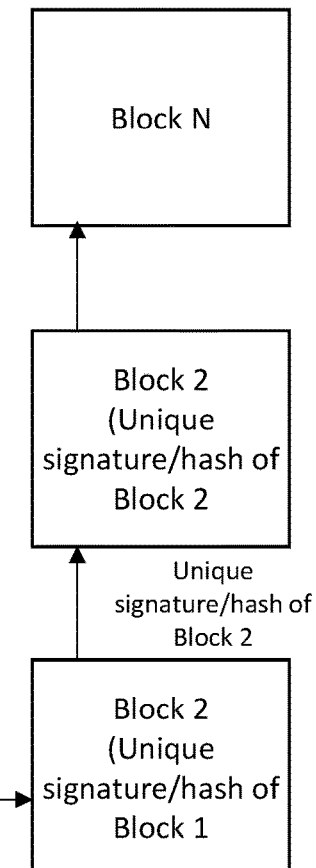

Unique signature/hash of Block 1
The blockchain builder computer uses an open-source cryptographic hash function (*a complex formula that turns any string of input into a unique 64-digit string of output*) to create a unique digital signature/hash from the unique string of data in Block 1.

Fig. 8

Template for Paper Logs Entitled
'Paper Log of Voter-Reports of Ballots Failing to Post on Any Stakeholder Blockchain'
&
'Paper Log of Voter-Reports of Altered-Ballots Posting to a Blockchain'

| Address of Polling Station: | | |
|---|---|---|
| Count | Date-Time-Group (DTG) (of voter's verbal report to election official) | Signature of Election Official (who received the voter's verbal report) |
| 1 | YYYY-MM-DD:HH:MM (Hand-Written) | *Signature of Election Official* |
| 2 | YYYY-MM-DD:HH:MM (Hand-Written) | *Signature of Election Official* |
| 3 | YYYY-MM-DD:HH:MM (Hand-Written) | *Signature of Election Official* |

Fig. 10

SYSTEM AND METHOD FOR DOCUMENT SECURITY THAT CAN BE USED IN A VOTE PROCESS

CROSS-REFERENCE TO RELATED APPLICATIONS

This application claims priority from a U.S. provisional patent application Ser. No. 63/505,597, filed on Jun. 1, 2023, which is incorporated herein by reference in its entirety.

FIELD OF INVENTION

The present invention relates to a method for securing a document that can, for example, be used in a vote casting method, and more particularly, the present invention relates to a system and method for coupling paper documents (or ballots) and blockchain technology in a document casting or ballot/vote casting process.

BACKGROUND

Voting refers to a process by which a group of people can express their collective opinion or make a collective decision. People in groups generally select their representative through voting. For example, in a democratic country like United States, people choose their public representative through a well-defined electoral system and the public representative form the government. The voting system, also referred to as the electoral system, defines a set of rules governing the representation and voting process.

Paper ballots are one of the oldest and most common methods for casting a vote. A paper ballot includes names of candidates, and a voter can mark his choice of candidate on the paper ballot and submit the same. The paper ballots are later counted and the candidate getting the highest number of votes wins the election. The paper ballot system has several drawbacks which led to the introduction of electronic voting systems.

The ballot marking device (BMD) does not create any other permanent record of the voter's choices; instead, it facilitates the electronic presentation of a ballot, the electronic selection of acceptable contest alternatives, and the generation of a human-readable [or partially human-readable] paper ballot. Voters deposit their ballots in state custody for counting after marking them with the BMD. The Help America Vote Act of 2002 mandated that all polling sites provide a way for voters with disabilities to vote in private and independently. In response, BMDs were created.

Votes are directly entered into the computer's memory in direct recording electronic (DRE) systems. These interfaces could have mechanical buttons, knobs, or touchscreens. The computer saves the voter's selections to a hard disc or cartridge. Voter Verified Paper Audit Trail (VVPAT) printers are another feature of certain DRE systems. These printers generate paper records that can be kept and tabulated in the event of an audit or recount.

The casting of electronic ballots online onto a blockchain from a personal digital identification certificate and/or a personal digital device is another recently developed voting technology that is now in the testing phase. To cast an electronic ballot online, voters need a personal digital identity certificate and a digital device, whether personal or not.

With advances in vote casting methods, few advances in vote counting methods have also been made. Traditionally, the paper ballots are hand counted. The said method is very laborious and time consuming. Optical Scanning of votes is now widely used in which the voters mark their votes by filling in an oval box, or similar shape on a paper ballot. The paper ballots are scanned either at the polling place or at a central location. In the case of online blockchain based vote casting, votes are counted using a blockchain explorer (search engine).

Beside all the advances, the prior art vote casting methods suffer from drawbacks, the primary being meeting security vulnerabilities which can be exploited to tamper or manipulate the process in favor of one candidate or against a candidate.

A need is therefore appreciated for a novel vote casting method that overcomes the drawbacks with conventional vote casting methods and systems.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method that guards against an individual or malware casting multiple ballots on a large scale.

Another object of the present invention is that the system and method ensure voter anonymity.

Still another object of the present invention is that the system and method guards against large-scale ballot tampering before, when, and after the ballot is cast into the ballot record.

Yet an object of the present invention is that the system and method enable voters to verify their ballots are marked and cast according to their intentions.

A further object of the present invention is that the system and method provide an immutable, tamper-evident, transparent record/trail of ballots to audit.

Still a further object of the present invention is that the system and method enable fast and easy vote casting.

Yet a further object of the present invention is that the system and method are economical to implement and scale up.

An additional object of the present invention is that the system and method provide for accurate vote counting.

An additional object of the present invention is that the system and method provide for transparent vote-counting that enables all stakeholders to observe and detect errors in the vote-counting process and vote tally.

An additional object of the present invention is that the system and method enable a voter to verify whether their personal ballot is included in the count.

An additional object of the present invention is that the system and method provide for fast, easy, and economical vote counting process.

In one aspect, disclosed is a document security method comprising printing a paper document, wherein the document comprises a main section and a shreddable section, the main section comprises a document data, the shreddable section comprises a document private key of a document public and private key pair. The main section comprises a document ID and a machine-readable code at an end of the main section, wherein the machine-readable code is configured to instruct a scanner device to stop scanning. The document data and the document ID are in a human-readable-machine-readable format. The shreddable section is configured to cut away from the document. The paper document is a ballot. The paper document has a front face and a rear face, wherein the document data, the document ID, and the document private key are printed on the front face. The method further comprises folding, in a sealable and tamper-proof manner, the paper document about the front face so that the front face is not visible. The document private key is printed as a Quick Response (QR) code. The document private key is in a non-human readable machine-readable format.

In one aspect, the method further comprises scanning and reading the main section of the paper document, by a scanner device to generate an unsigned datafile; upon scanning the main section, reading by the scanner device, the document private key from the shreddable section; and digitally signing the unsigned datafile using the document private key to generate a document-signed datafile. The unsigned datafile is an image of the main section. Also, the unsigned datafile may comprises information read from the main section using optical character recognition and optical mark recognition technologies.

In one aspect, the scanner device comprises a plurality of scanners, wherein the plurality of scanners is operated independently by a plurality of competing stakeholder.

In one aspect, the method further comprises upon reading the document private key, shredding the shreddable section of the paper document to destroy the document private key. The method comprises digitally signing the document-signed datafile using a scanner private key of a scanner public and private key pair associated with the scanner device to generate a document-and-scanner-signed datafile. The method further comprises encrypting the document-signed datafile using a cryptographic puzzle for each document-signed datafile to generate an encrypted-document-signed datafile, wherein the cryptographic puzzle is created by a unique cryptographic puzzle key created by cryptographic algorithms on the scanner device.

In one aspect, the method further comprises encrypting the document-and-scanner-signed datafile using a cryptographic puzzle for each document-and-scanner-signed datafile to generate an encrypted-document-and-scanner-signed datafile, wherein the cryptographic puzzle is created by a unique cryptographic puzzle key created by cryptographic algorithms on the scanner device.

In one aspect, the method further comprises receiving the encrypted-document-signed datafile by a blockchain database server; solving, by the blockchain database server, the cryptographic puzzle used to encrypt the document-signed datafile; upon solving, decrypting the encrypted-document-signed datafile; and upon decrypting, verifying the digital signature of the document-signed datafile using the document public key, wherein the document public key is pre-published.

In one aspect, the method further comprises receiving the encrypted-document-and-scanner-signed datafile by a blockchain database server; solving, by the blockchain database server, the cryptographic puzzle used to encrypt the encrypted-document-and-scanner signed datafile; upon solving, decrypting the encrypted-document-and-scanner-signed datafile; and upon decrypting, verifying the digital signatures on the document-and-scanner-signed datafile using the document public key and the scanner public key, wherein the document public key and the scanner public key are pre-published.

In one aspect, the method further comprises upon verification, storing the encrypted-document-and-scanner-signed datafile or the decrypted-document-and-scanner-signed datafile in a blockchain database.

In one aspect, the blockchain database is configured to allow keyword-based searches of the stored encrypted-document-and-scanner-signed datafile or the decrypted-document-and-scanner-signed datafile using the respective document ID, wherein the method further comprises searching the stored encrypted-document-and-scanner-signed datafile or the decrypted-document-and-scanner-signed datafile in the blockchain database using the respective document ID.

In one aspect, the method further comprises scanning and reading the main section of the paper document, by a scanner device to generate an unsigned datafile; and digitally signing the unsigned datafile using a scanner private key of a scanner public and private key pair associated with the scanner device to generate a scanner-signed datafile.

In one aspect, the method further comprises encrypting the scanner signed data file using a cryptographic puzzle for each scanner signed data file to generate an encrypted-scanner-signed datafile, wherein the cryptographic puzzle is created by a unique cryptographic puzzle key created by cryptographic algorithms on the scanner device.

In one aspect, the method further comprises scanning and reading the main section of the paper document, by a scanner device to generate an unsigned datafile; and encrypting the unsigned datafile to generate an encrypted-unsigned datafile.

In one aspect, the method further comprises upon verification, storing the encrypted-document-and-scanner-signed datafile or the decrypted-document-and-scanner-signed datafile in a plurality of blockchain databases, wherein the plurality of blockchain databases is operated independently by a plurality of competing stakeholder using a plurality of blockchain database servers.

In one aspect, the method further comprises verifying an integrity of the stored encrypted-document-and-scanner-signed datafile or the decrypted-document-and-scanner-signed datafile among the plurality of blockchain databases.

In one aspect, the method further comprises storing the encrypted-document-and-scanner-signed datafile or the decrypted-document-and-scanner-signed datafile in a layer-2 sidechain database of a blockchain database.

In one aspect, the method further comprises saving the encrypted-document-and-scanner-signed datafile or the decrypted-encrypted-document-and-scanner-signed datafile as a non-fungible token (NFT) linked to a blockchain database or a layer-2 sidechain database of a blockchain database.

In one aspect, the method further comprises dispensing, by an Unmarked-Document-Vending Machine, the paper document for subsequent marking/casting the paper document.

In one aspect, the scanner device comprises a Document-Casting Automated Teller Machine (ATM).

In one aspect, disclosed is paper document comprising a main section and a shreddable section, the main section comprises, a document data, wherein the shreddable section comprises a document private key of the document public and private key pair. The paper document further comprises a main section, and a shreddable section, wherein the main section comprises a document data, a document ID, and a machine-readable code at an end of the main section, wherein the machine-readable code is configured to instruct a scanner device to stop scanning, wherein the shreddable section comprises a document private key of the document public and private key pair.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 3 shows a more detailed version of the implementation of a paper ballot, according to an exemplary embodiment of the present invention.

FIG. 4 shows the flow of paper ballots and their information through the key hardware used in the system, according to an exemplary embodiment of the present invention.

FIG. 8 illustrates the blocks on a Stakeholder Ballot Blockchain and how they are cryptographically secured, according to an exemplary embodiment of the present invention.

FIG. 10 shows a template and the contents of the following two paper logs: a 'Paper Log of Voter-Reports of Ballots Failing to Post on Any Stakeholder Blockchain' and a 'Paper Log of Voter-Reports of Altered-Ballots Posting to a Blockchain.'

DETAILED DESCRIPTION

Figure 1:
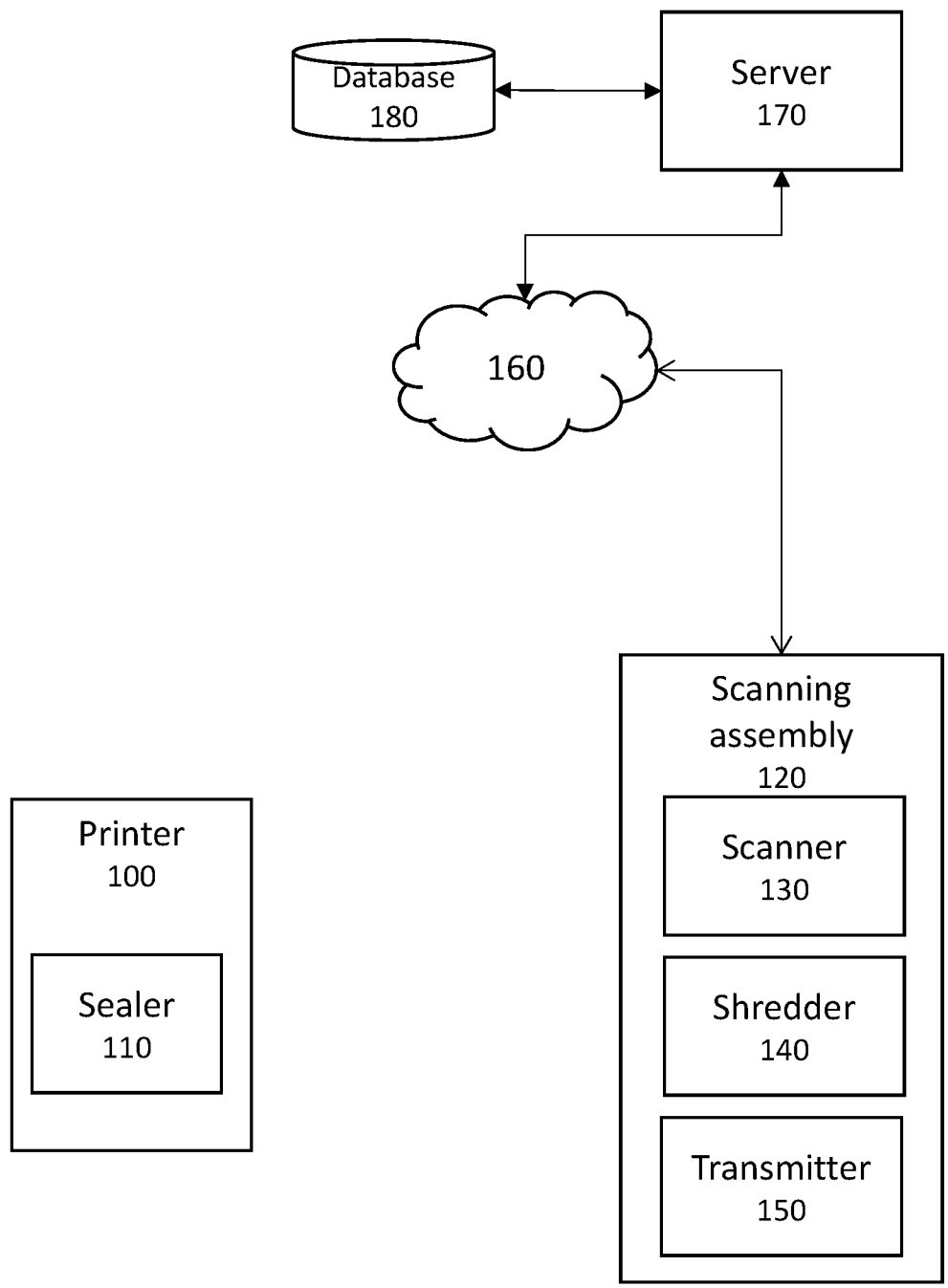
FIG. 1 is a block diagram illustrating an environment of the system, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed are a system and method that pairs paper ballots and blockchain technology in a vote-casting-and-counting process (or other document-counting process)—to create and maintain a set of transparent, immutable, tamper-evident, distributed, digital ledgers (a set of contending stakeholder Ballot Blockchains) of scanned voter-marked-paper-ballot images (with hashes) and/or voter-marked-paper-ballot data files (with hashes) that are each cryptographically secured with digital signatures from a paper Ballot Private Key (not linked to a human identity) and from multiple competing Stakeholder's Scanner Private Keys, which are validated by the public and the competing stakeholders using publicly published Ballot Public Keys and Stakeholder Scanner Public Keys.

The process uses 2 phases, 15 steps, 19 key types of hardware (this invention's 'Scalable Paper-Ballot-to-Blockchain Voting Kit' for a state/country) (depicted in the figures/drawings), 6 corresponding key types of software, and 3 types of reports—to enable voters to cast scanned voter-marked-paper-ballot images and/or data files (with hashes) [cryptographically secured with paper Ballot Private Key and Ballot Public Key pairs (not linked to a human identity) and multiple competing Stakeholder's Scanner Private Key and Public Key pairs] onto multiple contending Stakeholder Ballot Blockchains that each display the scanned ballot data on all the cast ballots.

Voters use a 'Ballot-Scanner-Set Assembly—with transmitting scanners from each competing stakeholder—at polling stations that scans their voter-marked-paper-ballots and then cryptographically secures and casts/transmits scanned voter-marked-paper-ballot images and/or data files (with ballot and competing stakeholder scanner digital signatures) to all the contending Stakeholder Ballot Blockchains, which each independently validate the scanned ballot data according to 'Ballot-Blockchain-Building Software/Rules' agreed upon by all the election stakeholders—the state and the competing political parties. The 'Ballot-Scanner-Set Assembly' shreds the Ballot Private Key (printed on the bottom section of the ballot) after the voter sends the paper ballot through scanner set assembly to prevent a bad actor from casting an altered version of the ballot.

Each scanned voter-marked-paper-ballot image and/or data file is cryptographically secured in transit and storage with a system that uses a Ballot Private Key and Ballot Public Key pair (not linked to a human identity); multiple competing stakeholder Scanner Private Key and Scanner Public Key pairs; and blockchain technology that creates an immutable, tamper-evident, distributed digital record of the scanned voter-marked-paper-ballot images and/or data files with publicly verifiable digital signatures.

Voters can look up their scanned ballot information on the Stakeholder Ballot Blockchains using the Ballot ID #(that they viewed in a private voting booth in their folded, sealed, tamper-evident paper ballot) to verify their ballots are included in the vote count, and they can also look up all other ballots that were cast around the same time as their ballot, so voter intimidators and vote purchasers are highly unlikely to know if voters are giving their own Ballot ID #to verify compliance with the bad actors.

Figure 2:
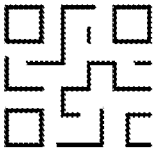
FIG. 2 shows an implementation of a paper ballot, according to an exemplary embodiment of the present invention.
Figure 5:
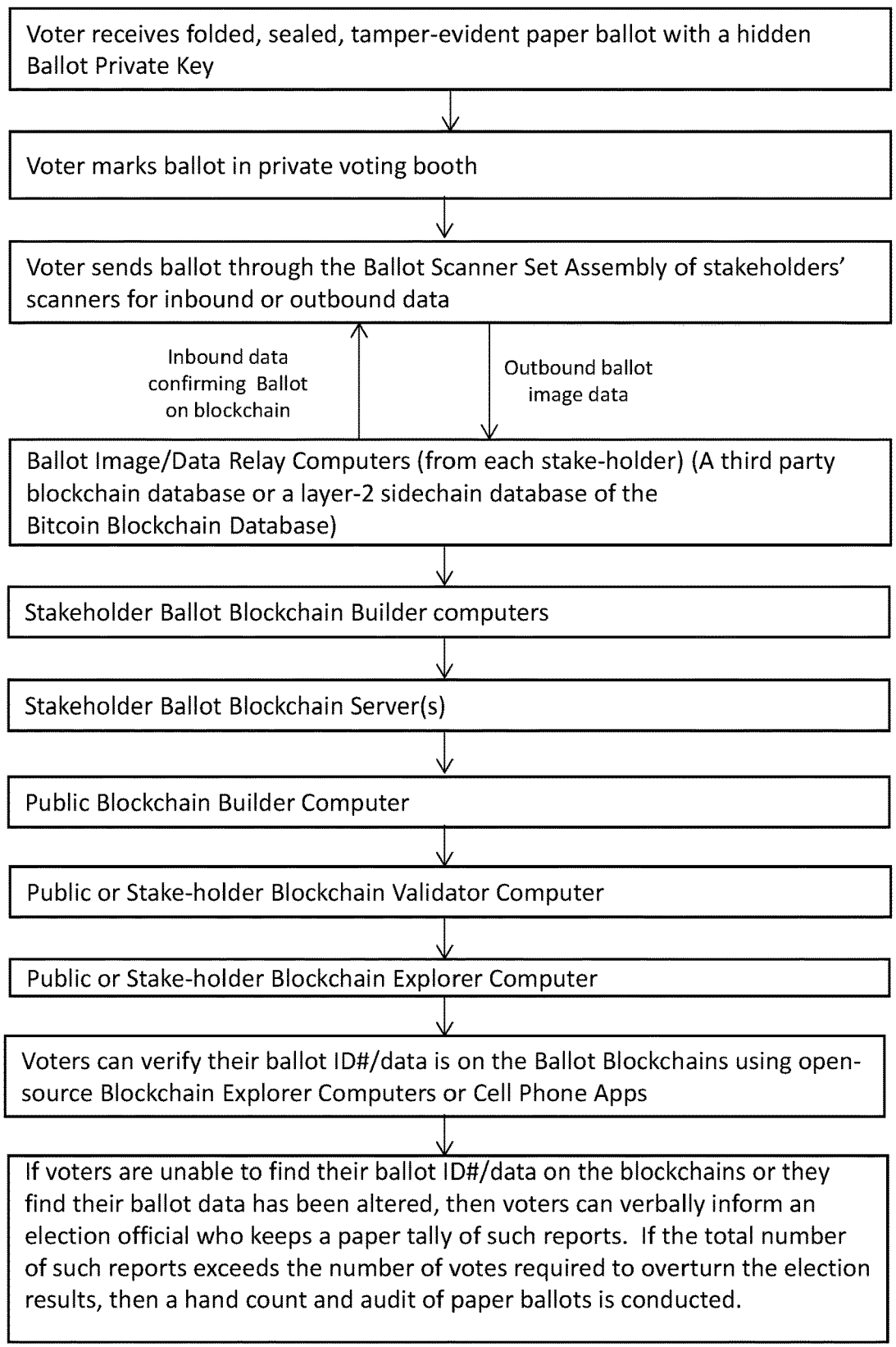
FIG. 5 shows an overview of the 'Paper-Ballot-to-Blockchain Voting System' that includes the role of people in the system along with the flow of paper ballots and their information through the key hardware used in the system, according to an exemplary embodiment of the present invention.
Figure 6:
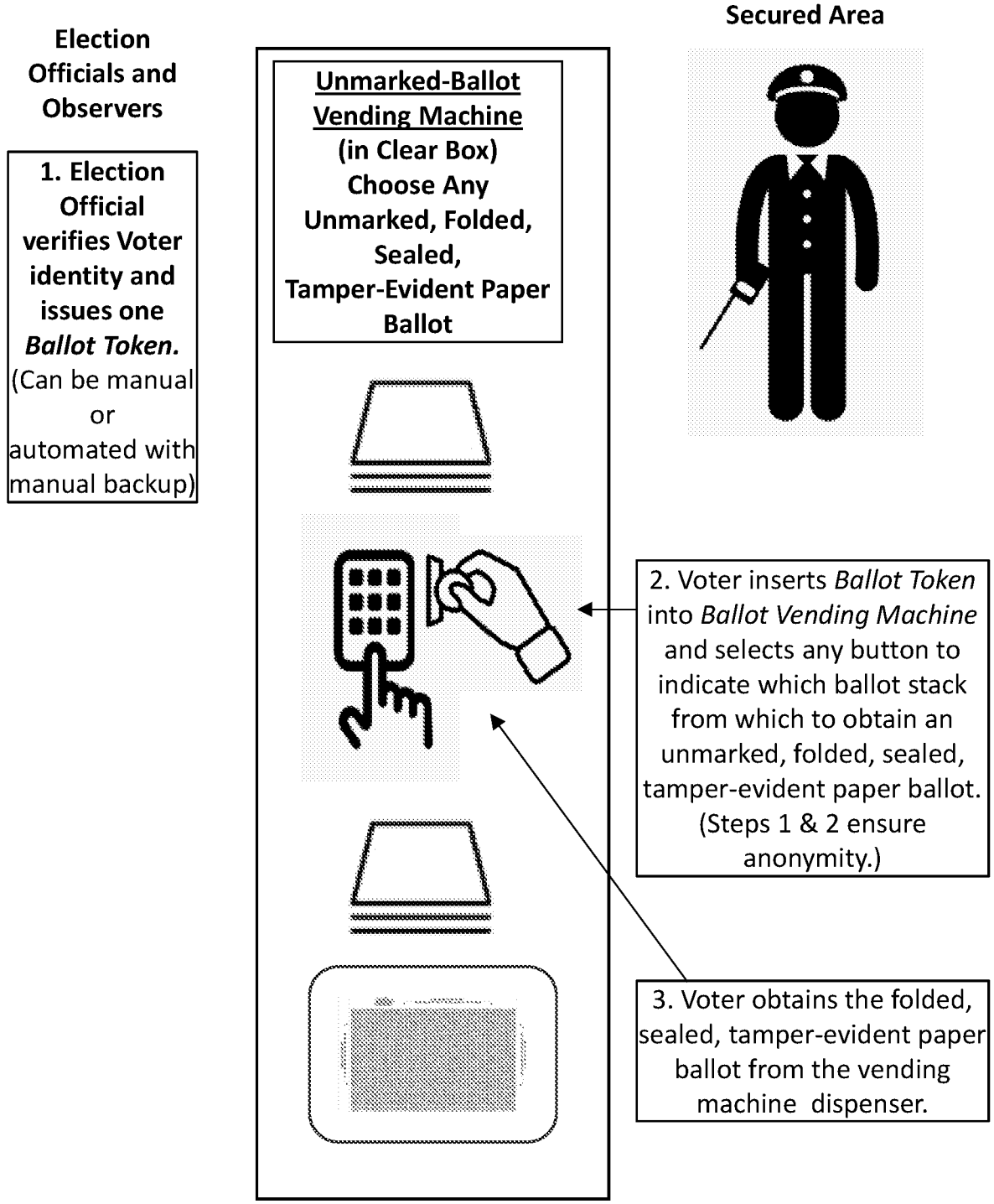
FIG. 6 shows an optional 'Unmarked-Ballot Vending Machine' (in a clear box) that accepts a 'Ballot Token' in exchange for a paper ballot to ensure voter anonymity and help make vote-casting easier to help improve voter turnout, according to an exemplary embodiment of the present invention.
Figure 7:
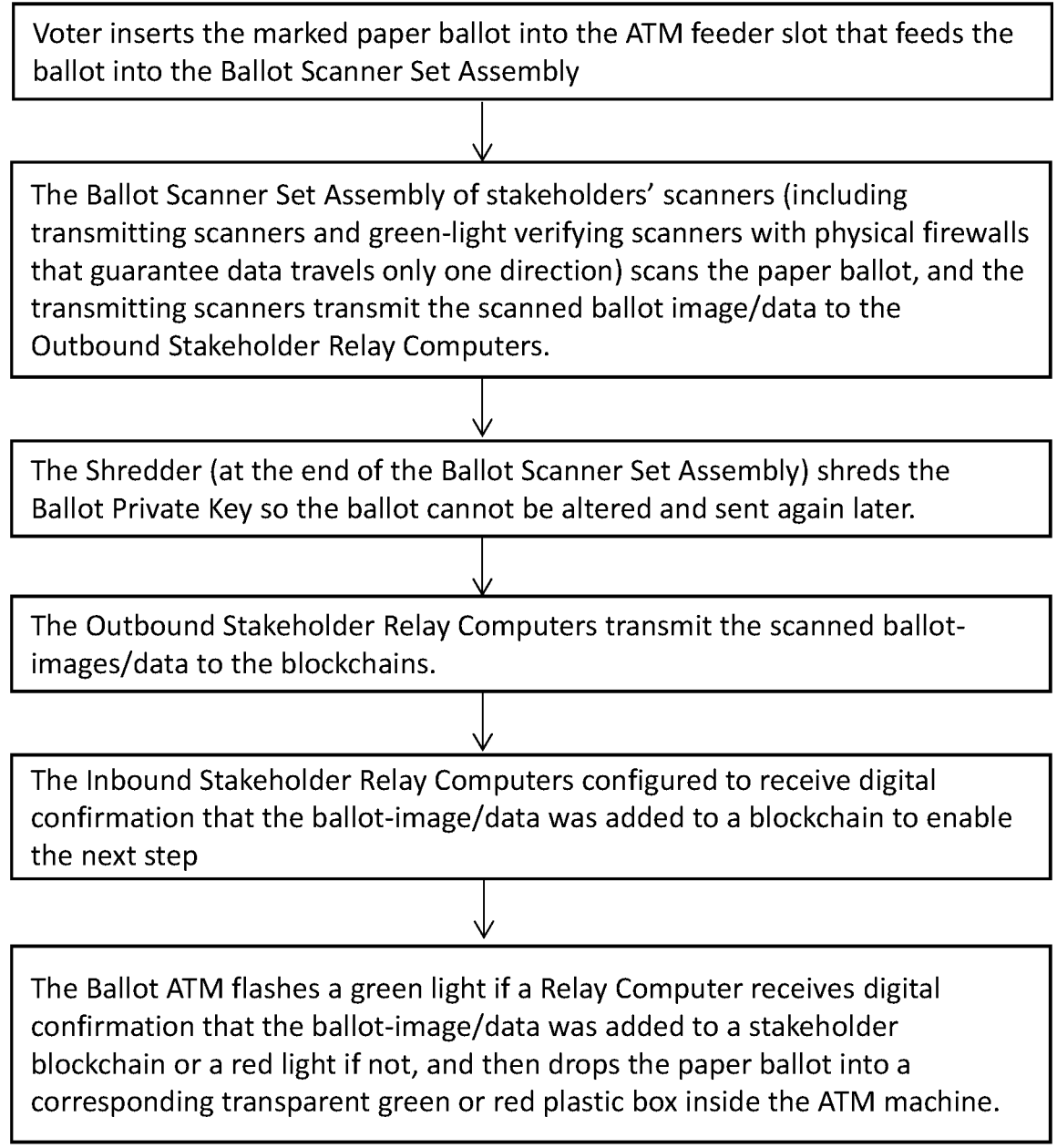
FIG. 7 shows an optional 'Marked-Ballot Automate Teller Machine (ATM)' (in a clear box) that accepts a paper ballot and transmits its data to a blockchain, and safeguards key equipment involved in that process, according to an exemplary embodiment of the present invention.
Figure 9:
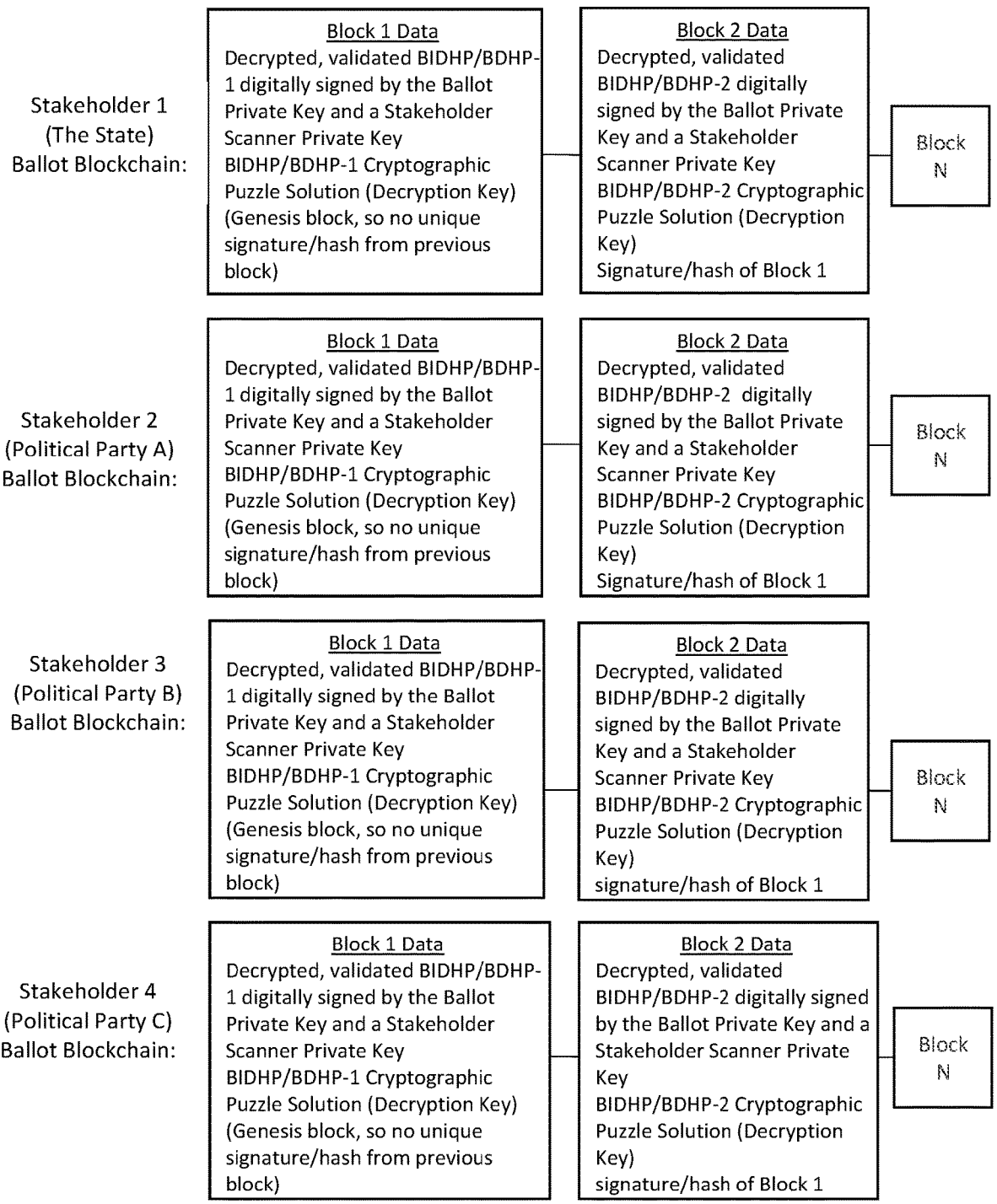
FIG. 9 shows a set of contending Stakeholder Ballot Blockchains and a brief description of the contents of each block on a Stakeholder Ballot Blockchain, according to an exemplary embodiment of the present invention.

Referring to FIG. 2 which shows an exemplary embodiment of a paper ballot 200. The printer can print the paper ballot. The ballot is not linked to a human identity. The ballot is folded and sealed in a tamper-evident way that conceals the ballot contents until the voter opens it in a private voting booth. The ballot can be printed and sealed by the printer. The ballot contents include the following: printed on the top section of each ballot, a Ballot ID. The ballot ID can be printed from an alphanumeric series and each Ballot ID can be unique. The ballot ID can be printed in human-readable format. The alphanumeric series includes a sequenced set of numbers corresponding to the total number of registered/eligible voters used to verify that the total number of cast ballots does not exceed the total number of registered/eligible voters. The top section of the ballot paper may also include a Ballot Public Key. Each ballot ID can be associated with a unique public private key pair. The public ballot key can be printed in an alphanumeric format i.e., any human-readable format. It is understood that the Ballot ID and public key printed on the paper ballot can be read by humans as well as machines. For example, OCR technique can be used to read the Ballot ID and public key in the form of text.

The ballot public private key pair is used to validate the authenticity of a scanned ballot image or a scanned ballot data file by validating its digital signature, the ballot digital signature is produced by a Ballot Private Key of the public private key pair. All the Ballot IDs and corresponding Ballor Public keys can be pre-published in a pre-election publication that lists all the Ballor IDs and corresponding Ballot Public Keys for the upcoming election.

Furthermore, the Ballot may include content for the voting process, such as a list of options from which the user can select and mark the same. Preferably, such content and/or markings can be read by a machine for vote counting. For example, OCR technology can be used to read the selections made by the user. The ballot includes a top section and a bottom section, such that the bottom section can be torn off from the top section and/or shredded from the top section.

A machine-readable code can be printed on an area in the top sections and in proximity to the bottom section. The machine-readable code can encode an instruction to stop the scanner from scanning the ballot further i.e., to limit the scanning of only the top section and the bottom section is not to be scanned. The bottom section and top section can be divided by a line or weakness that runs transversely.

On the bottom section of the ballot, a Ballot private key can be printed. The Ballot private key is the private key of the public private key pair associated with the respective ballot. The Ballot private key can be printed in a non-human readable format, such as a QR code The scanner using the ballot private key can create a digital signature for the scanned ballot image that in turn can be validated by the Ballot Public Key The bottom section of the ballot may be scanned by the scanner to read the Ballot private Key and then the scanner can shred the bottom section. The Ballot Private key can then be used to create a digital signature for the scanned ballot data and then the Ballot Private key can also be deleted from memory of the scanner. The Ballot Private key may only be temporarily available in the memory and not saved. The Ballot Private Key is not saved anywhere and neither published. The scanner-set assembly may shred the Ballot Private Key immediately after a voter runs the ballot through the scanner-set assembly, so it is impossible to later edit the paper ballot and re-scan and re-sign it with the Ballot Private Key printed on the paper ballot.

TABLE 1

Overview of key types of hardware and corresponding software:

| Key Hardware | Corresponding Key Software |
| --- | --- |
| 1. Custom-built 'Ballot Smart Printer' [1 primary and 1 backup] (The state selects the vendor) [Part of the 'Paper-Ballot-to-Blockchain Voting Kit'] | 1. Custom-built, open-source 'Paper-Ballot-Design Software' [The state selects the vendor] |
| 2. Custom-built 'Ballot-Scanner-Set Assembly' (that enables a paper ballot to be scanned, read, and transmitted as a ballot image and hash by all devices in the assembly when a voter feeds a paper ballot into the scanner set assembly) [Quantity required to support the voting population] (All stakeholders agree on a single vendor) Stakeholder Scanner Pair [1 per stakeholder] 3. 'Stakeholder-Transmitting-Ballot Scanner' [1 per stakeholder] (Each stakeholder selects its own vendor) 4. 'Stakeholder-Green-Light-Verifying Scanner' [1 per stakeholder] | 2. Custom-built, open-source 'Transmitting-Ballot-Scanner Software' [Each stakeholder selects its own vendor] 3. Custom-built, open-source 'Green-Light-Verifying-Ballot-Scanner Software' [Each stakeholder selects its own vendor] |

TABLE 1-continued

Overview of key types of hardware and corresponding software:

| Key Hardware | Corresponding Key Software |
|---|---|
| (Each stakeholder selects its own vendor)<br>5. Shredder located at the end of the Ballot-Scanner-Set Assembly (to shred the bottom section of the ballot that has the Ballot Private Key, so no one can later edit the paper ballot and re-scan and re-sign it with the ballot private key)<br>[1 per 'Ballot-Scanner-Set Assembly']<br>(All stakeholders agree on a single vendor)<br>[All part of the 'Paper-Ballot-to-Blockchain Voting Kit'] | |
| 6. Custom-built 'Stakeholder-Bidirectional/TCP-Outbound-Relay Computer'<br>[1 for each stakeholder]<br>(Each stakeholder selects its own vendor)<br>[Part of the 'Paper-Ballot-to-Blockchain Voting Kit'] | |
| 7. Custom-built 'Stakeholder-Unidirectional/UDP-Outbound-Relay Computer'<br>[1 for each stakeholder]<br>(Each stakeholder selects its own vendor)<br>[Part of the 'Paper-Ballot-to-Blockchain Voting Kit'] | |
| 8. Custom-built 'Stakeholder-Bidirectional/TCP-Inbound Relay Computer'<br>[1 for each stakeholder]<br>(Each stakeholder selects its own vendor)<br>[Part of the 'Paper-Ballot-to-Blockchain Voting Kit'] | |
| 9. Commercial, off-the-self modem (without a router)<br>[≥3 for each relay computer for redundancy]<br>[Part of the 'Paper-Ballot-to-Blockchain Voting Kit'] | |
| 10. Commercial, off-the-self modem (with a router)<br>[≥3 for each relay computer for redundancy]<br>[Part of the 'Paper-Ballot-to-Blockchain Voting Kit'] | |
| 11. Commercial, off-the-self satellite-internet antenna<br>[1 for each Satellite Internet Service Provider (ISP) at a polling station]<br>[Part of the 'Paper-Ballot-to-Blockchain Voting Kit'] | |
| 12. Commercial, off-the-self UHF/VHF/HF radio antenna<br>[Two of each at a polling station-one dedicated to transmitting and one dedicated to receiving]<br>[Part of the 'Paper-Ballot-to-Blockchain Voting Kit'] | |
| 13. Commercial, off-the-self computer used as 'Stakeholder-Ballot-Blockchain-Builder (Sequencer) Computer' [≥5 for each stakeholder (with the goal of ensuring at least one is always operational)]<br>(Each stakeholder selects its own vendor)<br>[Not part of the 'Paper-Ballot-to-Blockchain Voting Kit'] | 4. Custom-built, open-source 'Ballot-Blockchain-Builder (Sequencer) Software'<br>[All stakeholders agree on a single vendor] |
| 14. Commercial, off-the-self sever used as 'Stakeholder-Ballot-Blockchain Server'<br>[1 for each stakeholder (to store the primary/living copy of a stakeholder's Ballot Blockchain)]<br>(Each stakeholder selects its own vendor)<br>[Not part of the 'Paper-Ballot-to-Blockchain Voting Kit'] | 4. Custom-built, open-source 'Ballot-Blockchain-Builder (Sequencer) Software'<br>[All stakeholders agree on a single vendor] |
| 15. Commercial, off-the-self computer used as 'Public-Ballot Blockchain-Builder Computers'<br>[Unlimited #]<br>[Not part of the 'Paper-Ballot-to-Blockchain Voting Kit'] | 4. Custom-built, open-source 'Ballot-Blockchain-Builder (Sequencer) Software'<br>[All stakeholders agree on a single vendor] |
| 16. Commercial, off-the-self computer used as 'Stakeholder-Ballot-Blockchain-Validator Computers'<br>[Unlimited #]<br>[Not part of the 'Paper-Ballot-to-Blockchain Voting Kit'] | 5. Custom-built, open-source 'Ballot-Blockchain-Validator Software'<br>[All stakeholders agree on a single vendor] |
| 17. Commercial, off-the-self computer used as 'Public-Ballot-Blockchain-Validator Computers'<br>[Unlimited #]<br>[Not part of the 'Paper-Ballot-to-Blockchain Voting Kit'] | 5. Custom-built, open-source 'Ballot-Blockchain-Validator Software'<br>[All stakeholders agree on a single vendor] |
| 18. Commercial, off-the-self computer used as 'Stakeholder-Ballot-Blockchain-Display Websites/Computers' [Unlimited #]<br>[[Some are part of the 'Paper-Ballot-to-Blockchain Voting Kit' located inside a polling station, and some are not] | 6. Custom-built, open-source 'Ballot-Blockchain-Explorer Software'<br>[All stakeholders agree on a single vendor] |
| 19. Commercial, off-the-self computer used as 'Public-Ballot-Blockchain-Display Websites/Computers' [Unlimited #]<br>[Not part of the 'Paper-Ballot-to-Blockchain Voting Kit'] | 6. Custom-built, open-source 'Ballot-Blockchain-Explorer Software'<br>[All stakeholders agree on a single vendor] |

The system can generate reports in the following formats Ballot-Blockchain-Explorer-Vote-Tallies Report/Webpage, Ballot-Blockchain-Errors Report/Webpage, Voter-Reports of Ballots Failing to Post on Any Stakeholder Blockchain, and Voter-Reports of Altered-Ballots Posting to the Blockchain.

In certain implementations, the disclosed system and method can handle both the vote casting phase and vote counting phase. The disclosed system and method may also allow for audit of the voting process in a reliable and trusted manner. Moreover, the voters can easily and quickly verify that their vote has been cast and counted properly. The vote casting phase has been described below in steps 1-11 and the vote counting process has been described below in steps 12-15. It is understood that the steps are for describing the invention only and does not limit the scope of the invention to any specific order. Moreover, all the steps may not be essential for the implementation of the disclosed system and method.

Vote Casting Phase

Step 1

The state uses a 'Ballot Smart Printer' consisting of a computer-printer pair to design, print, fold, and seal the paper ballots in a tamper-evident way, each with a unique sequential ballot identification number (ID #), unique public encryption key, and a unique private encryption key that are concealed on the inside of the folded, sealed ballot.

It is to be noted that a paper ballot is not linked to a human identity. Also, each unused paper ballot is folded and sealed in a tamper-evident way that conceals the ballot contents until the voter opens it in a private voting booth. The total number of printed/paper ballots does not exceed the total number of registered (or eligible) voters by more than a selected percentage of ballots, such as 5% (to cover ballot loss, damage, or theft), which are safeguarded in a special batch that is only used and considered valid if the state makes an official finding that a specified number of the extra ballots are needed. Each paper ballot is secured and tracked with the same level of security as paper money (to thwart fraud). Like paper money, the paper ballots are given special makings that enable officials to recognize counterfeit ballots.

In certain implementations, each paper ballot contains, on the top section, a unique, human-readable Ballot ID #(that is NOT linked to a human identity) [from a sequenced set of numbers corresponding to the total number of registered/eligible voters used to verify that the total number of cast ballots does not exceed the total number of registered/eligible voters] and a unique, human-readable Ballot Public Key [used to validate the authenticity of a scanned ballot image or a scanned ballot data file by validating its digital signature produced by a Ballot Private Key], which are published by the stakeholders to the public before the election in a pre-election publication that lists all the Ballot ID #s and corresponding Ballot Public Keys for the upcoming election. Each ballot ID contains, on the bottom section, a unique non-human-readable Ballot Private Key in the form of a QR code, which is not published, so it can be used to create a digital signature for a scanned ballot image that is validated by the Ballot Public Key.

The Ballot Smart Printer deletes the ballot private keys from the computer-printer pair memory after the ballots have been printed. The Ballot Smart Printer assigns groups of sequential ballots to batch ID #s and assigns each batch ID #to a polling station, which the state publishes to the public before the election so that if officials discover a compromised ballot, they all know from which batch it came.

The Ballot Smart Printer shuffles the ballots in each batch, so voters can maintain anonymity. The Ballot Smart Printer may have no internet connection ability. The Ballot Smart Printer can be protected with the same level of security as money printers—to thwart fraud.

Step 2:

The state verifies each voter's identity via its chosen method.

Step 3:

The state provides a paper ballot to each voter. Each unused paper ballot is folded and sealed in a tamper-evident way that conceals the ballot contents until the voter opens it in a private voting booth. Thus, the ballot ID #, its public key, and its private key are not linked to a human identity, so voter anonymity is preserved. This step is the invention's non-tech solution to a key problem/roadblock to blockchain voting that blockchain experts identified—the problem being: the software required—to simultaneously 1) verify voter identity, 2) ensure voter anonymity (remove the identity of a voter when casting the ballot), and 3) prevent a single voter from creating multiple online identities to cast multiple ballots—has not yet been developed/solved and would be prone to error and hacks that could produce large scale effects and overturn the election results in an undetectable way, or if detected, would require a whole new election. With this invention, a whole new election would not be required if the blockchains were populated with erroneous ballots/votes because the paper ballots would exist in state custody for a hand-count or other type of counting method.

Optionally, voting administrators can dispense ballots using 'Unmarked-Ballot Vending Machines' (placed in controlled areas) to ensure voter anonymity and help improve the ease of voting to increase voter turnout. After a voter's identity is verified, the voter receives one 'Ballot Token' (can be manual or automated with manual backup), and then the voter inserts the Ballot Token into the Unmarked-Ballot Vending Machine and selects any button to indicate which ballot stack from which to obtain an unmarked, folded, sealed, tamper-evident paper ballot.

Step 4: Each voter 1) marks the ballot in a private booth, then 2) exits the booth to a 'Ballot-Scanner Set Assembly'-a set of three or more customized low-tech, stakeholder scanners (with unidirectional diodes that only permit data to exit not enter the scanners) that are under observation by election officials and observers, then 3) sends the ballot through the low-tech 'Ballot-Scanner Set Assembly,' which transmits the ballot separately (redundantly through all the connected 'Stakeholder Bidirectional/TCP and Unidirectional/UDP Outbound Relay Computers' and redundantly through multiple satellite internet ISPs, multiple traditional internet ISPs, and multiple UHF/VHF/HF radio antennas) to the 'Stakeholder Blockchain Builder Computers', and then shreds the bottom section of the ballot that has the Ballot Private Key so that no one can later edit the paper ballot and re-scan and re-sign it with the Ballot Private Key, and then 4) drops the ballot into a box with other marked paper ballots for the state to count via any other paper ballot counting method (such as hand-counting or optical scanning), while also enabling the invention's alternative paper-ballot-to-blockchain counting method.

It is to be noted that above step is the invention's low-tech solution to a key problem/roadblock to blockchain voting that blockchain experts identified—the problem being: the software required—to transmit a voter's online, electronic ballot/votes onto the blockchain with a digital identity certificate and/or personal digital device-would be prone to error and hacks that could produce large scale effects and overturn the election results in an undetectable way, or if detected, would require a whole new election. This invention would not require a whole new election if the blockchains were populated with erroneous ballots/votes because the paper ballots would exist in state custody for a hand-count or other type of counting method.

In more detail, within seconds of a voter feeding a ballot into the Scanner Set Assembly, each 'Stakeholder Transmitting Scanner' scans each paper ballot; creates a ballot-image excluding the Ballot Private Key [~1 MB of data]; creates a ballot-image hash [~32 bytes of data] (using an open-source cryptographic hash function that enables all stakeholders and the public to validate that the ballot image and the ballot-image-hash pass a data match check); records the ballot-voter-selection data [10 bytes-4 KB of data]; stores them together as a ballot-image-data-hash pack (BIDHP) [~1 MB of data]; stores just the ballot-voter-selection data and the ballot-image hash (and/or a ballot-data hash) as a ballot-data-hash pack (BDHP) [~5 KB of data]; digitally signs both the BIDHP and BDHP separately using the Ballot Private Key and the Scanner Private Key [~64 bytes of data]; encrypts separately both the BIDHP and BDHP using a unique scanner-created-and-signed publicly solvable cryptographic puzzle [~80 bytes for the cryptographic puzzle and ~32 bytes for the scanner digital signature, totaling ~112 bytes of data] (which would require malware infection on internet routers seeking to decrypt and perform keyword censorship of ballots to accomplish the complex task of solving a cryptographic puzzle, which would function as a deterrent because it may require more processing power and money in extra electricity than many routers have at their disposal); shreds the portion of the ballot with the ballot private key (after the scan is completed so no one can later edit the paper ballot and re-scan and re-sign it with the ballot private key); and transmits the signed, encrypted BIDHP [~1 MB of data] and the signed, encrypted BDHP [~5 KB of data] separately (redundantly through all the connected 'Stakeholder X Bidirectional/TCP and Unidirectional/UDP Outbound Relay Computers' and redundantly through multiple satellite internet ISPs, multiple traditional internet ISPs, and multiple UHF/VHF/HF radio antennas) to all the Stakeholder Ballot Blockchain Builder Computers, which are viewable on the public internet.

Each Stakeholder-Transmitting Scanner (in a Ballot-Scanner-Set Assembly) has many advantages. For example, has only unidirectional diodes at every data port that physically only permit data to exit (not enter) the scanner. Has three settings for transmitting the history of stored BIDHPs/BDHPs: 1) do not transmit history now, 2) transmit history once now, or 3) transmit history continuously, the vote(s) on each ballot (which has a valid, unique ballot ID #) will only be counted once by the open-source Ballot Blockchain Explorer Software (search engine). Is built by a company/manufacturer that is chosen by the stakeholder (each political party and the state). Each stakeholder makes a contract with its selected scanner-producing company that specifies an extremely high fee (that, in accordance with game theory, exceeds the expected amount that a bad actor would likely pay to compromise an election) if the scanner-producing company either compromises the scanner private keys or delivers scanners with malware.

Moreover, states and many private entities have many trusted companies that produce hardware for vital security systems, so this is not an unreasonable expectation. Moreover, states already trust companies to produce current voting system hardware, so this level of security is not lower than the current level of security—and is in fact a higher level of security because each stakeholder chose a different scanner-manufacturer so that competing interests of each stakeholder provide checks and balances in the system. Uses only open-source image scanning software, which is tested and inspected under observation of election officials and observers prior to use in an election. Has a scanner private key protected inside the scanner with the same level of security as cryptocurrency hardware-wallets, which make it essentially impossible to remove/obtain the private keys from the devices. Is placed on a clear plastic platform and under observation by election officials and observers.

Each stakeholder Bidirectional/TCP or Unidirectional/UDP Outbound Relay Computer (that relays BIDHPs/BDHPs from each stakeholder scanner to all the Stakeholder Ballot Blockchain Builder Computers, which are viewable on the public internet) offers many advantages. Relays BIDHPs and BDHPs received from EVERY transmitting scanner (in serial communication language) to their public internet destinations (in TCP/IP or UDP/IP internet language). Has a static IP address. Has minimal processing power and storage (to minimize malware threats from the internet).

TCP/Bidirectional Version: Has firewall software and is configured to only receive data from the internet that is required to enable TCP/IP functionality (to minimize malware threats from the internet).

UDP/Unidirectional Version: Has only unidirectional data diodes at every outbound data port that provide physical firewalls that guarantee data can only exit (not enter) the outbound relay computer at the data ports when connected to the internet.

The bidirectional/TCP or Unidirectional/UDP Outbound Relay Computer may be built by a company/manufacturer that is chosen by the stakeholder (each political party and the state). Is placed on a clear plastic platform and under observation by election officials and observers. It is to be noted that in case, Internet Service Provider (ISP) is corrupted by a bad actor and tries to employ keyword censorship on an opposing ballot's BIDHPs/BDHPs, the censorship will likely be ineffective because BIDHPs/BDHPs are transmitted over multiple ISPs and over multiple radio frequency antenna. Also, if a stakeholder scanner or a stakeholder blockchain tries to employ keyword censorship on an opposing ballot's BIDHPs/BDHPs, the censorship will 1) likely be ineffective because the opposing stakeholder has incentive to publish those opposing BIDHPs/BDHPs on its blockchain and 2) be evident because the public and all the stakeholders will be able to see (on the contending stakeholder ballot blockchains) that one or more of the validated BIDHPs/BDHPs for a particular opposing Ballot ID #are missing on a particular blockchain, while the other(s) are published on the same blockchain or different blockchains.

Optionally, voting administrators can use 'Marked-Ballot Automated Teller Machines (ATMs)' (placed in controlled areas) to hold and safeguard the Scanner Set Assembly and the Relay Computers in clear ATM boxes and to help improve the ease of voting and increase voter turnout. After the voter marks their ballot, the voter inserts their ballot into the 'Marked-Ballot ATM,' which processes the ballot as described in his step. The Ballot ATM flashes a green light if a Relay Computer receives digital confirmation that the ballot-image/data was added to a stakeholder blockchain or a red light if not, and then the paper ballot is dropped into a corresponding transparent green or red plastic box inside the ATM machine.

Step 4a: An alternative or back up to Steps 4-6, this step is the same as Step 4 except the 'Ballot-Scanner Set Assembly' transmits the BDHP (or possibly a BIDHP) to a third party blockchain database service that saves the BDHP/BIDHP itself or alternatively saves the BDHP/BIDHP as a non-fungible token (NFT) in a layer-2 sidechain database of the Bitcoin blockchain database or in a different third party Blockchain Database. The purpose of this is the following: The Bitcoin Blockchain database is the most secure blockchain database in the world because it has the most database servers/nodes of all blockchains in the world, so a method that enabled the ballot images or digital data packs to be linked to the Bitcoin Blockchain database would provide exceptional security for the ballot information. This step would require payment for the cost of the transactions that link the BIDHP or BDHP to the third party blockchain database. This is feasibly worth the cost due to the security it provides in storing the ballot data in an immutable way that would alleviate voting administrators from paying to store the ballot data on its own servers, which would have far weaker security.

Step 5

Each 'Blockchain Builder Computer,' within ~45 seconds, receives separately each new stakeholder-encrypted BIDHP and BDHP (from all the stakeholder Transmitting Ballot Scanners); validates separately the stakeholder-scanner digital signature on the unique publicly solvable cryptographic puzzle encrypting separately each new BIDHP and each new BDHP; transmits separately each new stakeholder-encrypted BIDHP and BDHP to other computers participating in the stakeholder Ballot Blockchain Network; decrypts separately each new BIDHP and BDHP (by solving each cryptographic puzzle within ~40 seconds each); validates separately each new decrypted BIDHP and BDHP (using the Ballot Public Key and the Scanner Public Key); builds each new validated decrypted BIDHP into a new block for a stakeholder BIDHP Ballot Blockchain (one BIDHP per block) (eventually creating a 120 TB blockchain if each block is ~1 MB and there are 40,000,000 ballots, each transmitted three times, each via a stakeholder signed BIDHP); builds each new validated BDHP into a new block for a separate stakeholder BDHP Ballot Blockchain (one BDHP per block) (eventually creating a 600 MB blockchain if each block is ~5 KB and there are 40,000,000 ballots, each transmitted three times, each via a stakeholder signed BDHP); and sequences, validates, and adds each BIDHP block onto a stakeholder BIDHP Ballot blockchain (on the Stakeholder's Ballot Blockchain Server) and sequences, validates, and adds each BDHP block onto a stakeholder BDHP Ballot blockchain (on the Stakeholder's Ballot Blockchain Server) according to the open-source Ballot Blockchain-Building Software rules agreed upon by all the stakeholders.

It is to be noted that each stakeholder is required to build both a Stakeholder BIDHP Ballot Blockchain and a Stakeholder BDHP Ballot Blockchain because the typical member of the public has only enough computer storage capability to act as a validator for a BDHP-size blockchain. When computer data storage capability increases sufficiently, then only BIDHP Ballot Blockchains will be necessary.) Each Stakeholder has >5 Blockchain Builder Computers (each with satellite internet connectivity, traditional internet connectivity, and Radio antenna connectivity) with the goal of ensuring least one is always operational. Also, each Stakeholder Blockchain Builder Computer has extremely high processing power (hash rate), so it can decrypt the BIDHP/BDHP Cryptographic Puzzle within ~40 seconds, much faster than most computers. Also, each Stakeholder Blockchain Builder Computer sends new blocks to the Stakeholder X Ballot-Blockchain-Server [1 for each stakeholder] (with satellite internet connectivity, traditional internet connectivity, or Radio antenna connectivity)—which stores the primary/living copy of a stakeholder's Ballot Blockchain. Also, each Stakeholder Ballot Blockchain is required to have all Ballot-Image-Data-Hash Packs (BIDHPs) or all Ballot-Data-Hash Packs (BDHPs) from every stakeholder transmitting scanner. Also, each Stakeholder Ballot Blockchain is built according to the following open-source Ballot Blockchain Builder Software/rules (agreed upon by all the stakeholders):

Rule 1

Each BIDHP/BDHP must meet the following criteria to pass a validation check to become a "validated BIDHP/BDHP" that the Ballot Blockchain Builder Software will add to a Ballot Blockchain according to the Ballot Blockchain rules; otherwise, it becomes an "invalid BIDHP/BDHP" that (the Ballot Blockchain Builder Software will not add to a Ballot Blockchain according to the ballot blockchain rules.

Criteria 1: Each BIDHP/BDHP must have a valid, unique Ballot ID #that matches a pre-election publication that lists all the valid Ballot ID #s (equal to the number of registered/eligible voters, plus a selected percentage (such as 5%) to cover lost, damaged, or stollen ballots, which are only used and considered valid if the state makes an official finding that the extra ballots are needed, in which case the lost/damaged/stolen ballot ID #s would be de-validated). Note: This rule enables voters to look up their Ballot ID #with the open-source Ballot Blockchain Explorer (search engine) and verify that their scanned ballot information was added to the stakeholder Ballot Blockchains. This rule also enables stakeholders to control and verify that the total number of unique ballots (Ballot ID #s) on the blockchains does not exceed the total number of registered/eligible voters. The state's Ballot Smart Printer creates the list of sequential Ballot ID #s (each with a corresponding unique Ballot Public Key) and then each stakeholders publishes the list by sending it through the Ballot Scanner-Set Assembly, enabling each stakeholder-transmitting scanner to add its digital signature to the list, transmit the list to every stakeholder's Ballot Blockchain Server, and publish all the stakeholder-signed copies of the list on its website. If the state must activate/validate any of the extra Ballot ID #s due to lost, damaged, or stollen ballots, then all the stakeholders follow the same procedures again to publish the list of newly activated/valid Ballot ID #s and deactivated/de-validated Ballot ID #s that were lost/damaged/stollen.

Criteria 2: Each BIDHP/BDHP must have a validated digital signature from the Ballot Private Key, which is validated if the corresponding Ballot Public Key (published before the election) shows that the hash of the BIDHP/BDHP in the digital signature matches the content of the BIDHP/BDHP. Note: All the Ballot Public Keys (and their corresponding Ballot ID #s) are published in a list by each stakeholder before the election in stakeholder pre-election publications. All the Ballot Private Keys (which are printed and hidden in a non-human readable QR code format on the bottom section of the folded, sealed, tamper evident ballot until the voter opens the ballot privately) are shredded by the Ballot-Scanner-Set Assembly after all the stakeholder scanners scan the ballot, so no one can later edit the paper ballot and re-scan and re-sign it with the ballot private key.

Criteria 3: Each BIDHP/BDHP must have a validated digital signature from the Scanner Private Key, which is validated if the corresponding Scanner Public Key (published before the election) shows that the hash of the BIDHP/BDHP in the digital signature matches the content of the BIDHP/BDHP. Note: The following sequence of state and stakeholder publications validate each stakeholder, each 'Stakeholder Public Key,' and each stakeholder's 'Scanner Public Key' list (one 'Scanner Public Key' per scanner): 1) the state publishes a list of stakeholders with links to each stakeholder website and 2) each stakeholder website publishes the stakeholder's own 'Scanner Public Key' list, which is digitally signed using the 'Stakeholder Private Key,' which can be validated with the 'Stakeholder Public Key' that is published on the state and stakeholder websites. [Note: This sequence is necessary because stakeholder trust cannot be based on scanner trust when the stakeholder controls the scanners]. The stakeholder scanner digital signatures serve two key purposes: 1) enable stakeholders to show agreement and catch fraud on the content of a BIDHP/BDHP and 2) create another obstacle to bad actors seeking to transmit fraudulent BIDHPs/BDHPs to the ballot blockchains. Bad actors would need to steal both a scanner and paper ballots to transmit BIDHPs/BDHPs with valid digital signatures from the scanner private key and ballot private key-instead of steeling only paper ballots and transmitting BIDHPs/BDHPs from any device. Additionally, good actors are more likely to notice two types of theft than one. Moreover, good actors are likely to notice the theft of a scanner faster than the theft of ballots because stakeholders only need to monitor dozens of scanners at the busiest of polling stations, while the state needs to monitor thousands of ballots at a polling station.

Criteria 4: Each BIDHP's ballot image and ballot-image hash must pass a data-match check, using the designated open-source cryptographic hash function to show the ballot-image hash was created with the designated open-source cryptographic hash function.

Criteria 5: Each BIDHP's ballot image and ballot-selection data must pass a data-match check. Note: A single Ballot ID #will be transmitted multiple times in different BIDHPs/BDHPs—that are each created and transmitted by a different stakeholder-transmitting scanner, each with a different scanner private key digital signature but identical ballot private key digital signatures. It would be exceedingly difficult for bad actors to create validated BIDHPs/BDHPs because they would need to steel both paper ballots (or Ballot Private Keys) and a stakeholder-transmitting scanner (or a scanner private key) without the stakeholders, election officials, or election observers noticing. Adding to the difficulty, the ballot private keys are deleted from the ballot smart printer after the ballots are printed and each shredded off after the ballots are run through the scanner-set assembly.
Rule 2

Each stakeholder must build its own blockchain for each election on the Stakeholder's Ballot Blockchain Server using its Blockchain Builder Computers and every validated BIDHP/BDHP that is received from every stakeholder-transmitting scanner. Since the Blockchain Builder Computers do not have the Ballot Private Keys or the Scanner Private Keys to make valid digital signatures on the BIDHPs/BDHPs, they cannot edit the content of a validated BIDHP/BDHP without compromising its match to the Ballot Private Key digital signature and the Scanner Private Key digital signature, so the only way for a bad actor to make it appear that a corrupted Ballot Blockchain has not been corrupted is to censor opposing ballots, but that is likely a futile effort because the corrupted blockchain will not be used in isolation to count the votes—the other competing stakeholder blockchains will also be used to count the votes.

It is to be noted that if a stakeholder scanner or a stakeholder blockchain tries to employ keyword censorship on an opposing ballot's BIDHPs/BDHPs, the censorship will 1) likely be ineffective because the opposing stakeholder has incentive to publish those opposing BIDHPs/BDHPs on its blockchain and 2) be evident because the public and all the stakeholders will be able to see (on the contending stakeholder ballot blockchains) that one or more of the validated BIDHPs/BDHPs for a particular opposing Ballot ID #are missing on a particular blockchain, while the other(s) are published on the same blockchain or different blockchains.

Validator Computers (belonging to the other stakeholders and the public) each use an open-source Ballot Blockchain Explorer (search engine) to search and compare all the contending Stakeholder Ballot Blockchains and then each automatically create and publish consolidated results on a 'Ballot-Blockchain-Errors Report/Webpage' that automatically creates and periodically updates 1) a list of validated BIDHPs/BDHPs that are missing on a given blockchain (evident because the BIDHPs/BDHPs are published on another contending stakeholder blockchain or because a blockchain has a Ballot ID #with BIDHPs/BDHPs from only one or some stakeholder scanners (rather than all of them)) and 2) a list of any invalid BIDHPs/BDHPs that are published on the blockchain (which cannot happen with valid Ballot Blockchain Builder Software).

Validator Computers (belonging to the other stakeholders and the public) each download and compare a blockchain's newly-published history to a previously-published history (that the Validator Computer downloaded), and if the histories don't match, then each Validator Computer automatically creates and publishes a 'Ballot-Blockchain-Errors Report/Webpage' that automatically creates and periodically updates 1) a list of validated BIDHPs/BDHPs that are missing on the blockchain's newly published history (evident because they were on the blockchain's previously published history) and 2) a list of any invalid BIDHPs/BDHPs that are published on the blockchain (which cannot happen with valid Ballot Blockchain Builder Software).

If any of the Validator Computers' Blockchain Errors Repot Webpages publish false or mistaken information, they will not harm the blockchains or vote tallies because the errors report webpages are produced by a blockchain explorer that can only search (not edit) the blockchains, yet the stakeholders will still be publicly alerted to missing BIDHPs/BDHPs that they need to add to their blockchains.

Blockchain Builder Computers can easily identify any BIDHPs/BDHPs that their stakeholder blockchain is missing-using other stakeholder blockchains, the Validator Computers' 'Ballot-Blockchain-Errors Reports/Webpages', or the ballot scanners' history re-transmissions—and add them to their blockchain (and if they don't, then the Validator Computers (belonging to the other stakeholders and the public) will publish a Blockchain Errors Repot Webpage about that blockchain, which violated the blockchain rules/software).

An open-source Ballot Blockchain Explorer (search engine) ensures every blockchain-published, validated BIDHP/BDHP is used, according to the Ballot Blockchain rules, to report vote tallies by searching every stakeholder blockchain for every validated BIDHP/BDHP.

The purpose of building and comparing multiple contending-stakeholder blockchains (rather than building one blockchain via coordination among all the competing stakeholders, which is much slower) is to—eliminate the need to gain enough Blockchain Builder Computers to solidify protection against a 51% attack (which is extremely difficult for any new public blockchain to accomplish these days now that blockchains get a lot of attention); eliminate the need to develop an economic incentive model for adding blocks; and enable immediate feedback on whether a ballot was successfully added to the stakeholder blockchains-all while still maintaining the trustless nature and benefits of blockchain technology.

The purpose of each stakeholder building a new blockchain for each election is to keep the blockchain down to a reasonable size to enable the public download it and to keep ballot counting simpler and clearer.

Rule 3

Each block on a blockchain must contain 1) a single decrypted, validated BIDHP/BDHP digitally signed by both the Ballot Private Key and a Stakeholder X Scanner Private Key; 2) the solution (decryption key) to the unique cryptographic puzzle that a stakeholder-transmitting scanner placed on the BIDHP/BDHP; and 3) the unique digital signature/hash of the previous/"parent" block (except the genesis block, which has no parent block).

Note: A single Ballot ID #will post on a blockchain multiple times in different validated BIDHPs/BDHPs—that are each created, digitally signed, and transmitted by a different stakeholder-transmitting scanner, each with a different scanner private key digital signature but identical ballot private key digital signatures.

Note: The open-source Ballot Blockchain Explorer will only count a single Ballot ID#once—after verifying that all the stakeholder-scanner-signed, blockchain-published, validated BIDHPs/BDHPs for a given Ballot ID #across the entire stakeholder blockchain (or all stakeholder blockchains) have unanimous agreement on their voter selection data.

This means that the criteria to count a vote is unanimous agreement among all the stakeholder-scanner-signed, blockchain-published, validated BIDHPs/BDHPs for a given Ballot ID #across all stakeholder blockchains.

Thus, if a stakeholder does not transmit or publish a BIDHP/BDHP for a given Ballot ID #onto a blockchain, then the absence of that BIDHP/BDHP for that Ballot ID #does not invalidate the other stakeholder-scanned-signed, blockchain-published, validated BIDHPs/BDHPs for that Ballot ID #as long as they match each other. This prevents a stakeholder from invalidating opposing ballots by withholding them.

The reason that the criteria to count a vote is not unanimous agreement among all the stakeholders (but rather unanimous agreement among all stakeholder-scanner-signed, blockchain-published, validated BIDHPs/BDHPs) is that a stakeholder could easily invalidate opposing ballots/BIDHPs/BDHPs by withholding them.

The reason that the criteria to count a vote is not majority agreement among the stakeholders is that in a two-party system, which would consist of three stakeholders (the state, political party A, and political party B), a bad actor would not face a particularly difficult task of corrupting two out of three stakeholders because the state incumbent party would have the same interests as one of the other stakeholder parties.

Note: All validated BIDHPs/BDHPs are added to a blockchain, even if any of the validated BIDHPs/BDHPs for a given Ballot ID #show differing voter selection data.

Note: If all the stakeholder-scanner-signed, blockchain-published, validated BIDHPs/BDHPs for a given Ballot ID #have unanimous agreement on their recorded voter-selection data, then the open-source Ballot Blockchain Explorer will count that Ballot ID #in its vote tally on 'Ballot-Blockchain-Explorer-Vote-Tallies Report/Webpage'.

Note: Alternatively, if any of the stakeholder-scanner-signed, blockchain-published, validated BIDHPs/BDHPs for a given Ballot ID #lack unanimous agreement on their recorded ballot-selection data, then the open-source Ballot Blockchain Explorer will discount that Ballot ID #from vote tallies on the 'Ballot-Blockchain-Explorer-Vote-Tallies Report/Webpage' and list all the stakeholder-scanner-signed, blockchain-published, validated BIDHPs/BDHPs for that Ballot ID #separately with the label "undetermined and flagged for investigation" in a separate list on the 'Ballot-Blockchain-Explorer-Vote-Tallies Report/Webpage.'

If, at the end of the vote casting phase, the total number of Ballot ID #s with BIDHPs/BDHPs labeled "undetermined and flagged for investigation" could not possibly overturn the election results, then no official audit will be conducted to compare the paper ballots with the ballot images to identify the valid BIDHPs/BDHPs and include them in the count. However, investigations of "undetermined BIDHPs/BDHPs" will still be conducted, and "invalid BIDHPs/BDHPs" will be saved by the state to find and prosecute bad actors who sought to influence an election.

If, at the end of the vote casting phase, the total number of Ballot ID #s with BIDHPs/BDHPs marked "undetermined and flagged for investigation" could overturn the election results, then an audit and investigation will be conducted to compare the paper ballots with the ballot images to identify paper-audit-validated BIDHPs/BDHPs and include them in the count manually. If a paper ballot (of a particular Ballot ID #) proves that an "undetermined BIDHP/BDHP" (of that same Ballot ID #) was erroneous (due to an ambiguously marked paper ballot) or was falsified, then the "undetermined BIDHP/BDHP" becomes designated an "erroneous/fraudulent BIDHP/BDHP."

Note: The publicly solvable cryptographic puzzle functions as a deterrent to keyword ballot censorship by forcing bad actors to expend time, hacker expertise, computer resources, and electricity/money on efforts to perform keyword censorship on routers (or other devices) in the multiple internet paths of a BIDHP/BDHP to its various destinations, which would require malware infection on those internet routers/devices to accomplish the complex task of solving a cryptographic puzzle (to decrypt the BIDHP/BDHP) and then censoring the BIDHP/BDHP based on key words, which may require more processing power and money in extra electricity than many routers have at their disposal.

Note: If bad actors cannot see the contents of a ballot, then they do not know if it meets their biased censorship criteria, and if they want to know, then they must expend resources, which is a deterrent to the censorship.

Note: Two additional obstacles in the cryptographic puzzle deterrent are that since every Stakeholder transmitting scanner adds a different cryptographic puzzle to a given BIDHP/BDHP, a bad actor would need to intercept every BIDHP/BDHP containing a given Ballot ID #and decrypt multiple cryptographic puzzles to perform keyword censorship on that single Ballot ID #(whereas a Blockchain Builder Computer only needs to decrypt one cryptographic puzzle to publish a given Ballot ID #on its blockchain).

Rule 4

The BIDHPs/BDHPs (each contained in a single block) must be sequenced in order of receipt on a given blockchain, and if receipt timing is tied, then the lowest Ballot ID #is sequenced first. (Each stakeholder blockchain will likely have a different BIDHP/BDHP sequence (because each stakeholder blockchain will likely receive the BIDHPs/BDHPs over the internet in a different sequence) but will have the same source of BIDHPs/BDHPs and thus contain the same BIDHPs/BDHPs (unless there is censorship or repeated transmission failures).

Rule 5

The sequence of blocks (each containing one BIDHP/BDHP) must be locked in using an open-source cryptographic hash function to create a unique digital signature/hash of each block's data and add that unique signature/hash to the data of the next/"child" block, so that each parent block is cryptographically linked to its child block in the blockchain [thereby creating a tamper evident chain/history of blocks (BIDHPs/BDHPs) when Validator Computers compare each newly published history of the blockchain to its previously published history (which guards against the deletion of opposing blocks (BIDHPs/BDHPs) on the blockchain)].

Rule 6

Each blockchain's newly published history must match its previously published histories. It is to be noted that validator Computers (belonging to the other stakeholders and the public) each download and compare a blockchain's newly-published history to a previously-published history (that the Validator Computer downloaded), and if the histories don't match, then each Validator Computer automatically creates and publishes a 'Ballot-Blockchain-Errors Report/Webpage' that automatically creates and periodically updates 1) a list of validated BIDHPs/BDHPs that are missing on the blockchain's newly published history (evident because they were on the blockchain's previously published history) and 2) a list of any invalid BIDHPs/BDHPs that are published on the blockchain (which cannot happen with valid Ballot Blockchain Builder Software). Thus, if Validator Computers catch a stakeholder blockchain publishing a changed history, the other competing stakeholders and the public will be alerted, and furthermore, the open-source Ballot Blockchain Explorer (search engine) will include all the other contending stakeholder Ballot Blockchains when counting votes to ensure every published-validated BIDHP/BDHP is counted-since the competing stakeholders' blockchains are likely to have the BIHDPs that the offending stakeholder sought to censor.

Moreover, if any of the Validator Computers' 'Ballot-Blockchain-Errors Report/Webpage' publish false or mistaken information, they won't harm the blockchains or vote tallies because the errors report webpages are produced by a blockchain explorer that can only search (not edit) the blockchains, yet the stakeholders will still be publicly alerted to missing BIDHPs/BDHPs that they need to add to their blockchains.

Aso, if any "undetermined BIDHPs" (that have validated digital signatures but lack unanimous agreement with any of the other BIDHPs/BDHPs with the same Ballot ID #) are proven to be "paper validated BIDHPs/BDHPs" that match the paper ballots in the state's holdings (typically during an election audit), then they must be manually added to the vote tallies. "Undetermined BIDHPs/BDHPs" (that have valid digital signatures but lack unanimous agreement with any of the other BIDHPs/BDHPs with the same Ballot ID #), "erroneous/fraudulent BIDHPs/BDHPs" (that have valid digital signatures but do not match the paper ballot), and "invalid BIDHPs/BDHPs" (that lack a valid Ballot Private Key digital signature and a valid Scanner Private Key digital signature), should not be removed from a blockchain's history because a blockchain history should not be changed, because the open-source Ballot Blockchain Explorer will simply discount any undetermined, erroneous/fraudulent, and invalid BIDHPs/BDHPs in determining the vote tallies, and because they are evidence for investigations into election tampering.

Each stakeholder Ballot Blockchain is characterized as immutable because Validator Computers (belonging to other stakeholders and the public) repeatedly download copies of it to compare its newly published history with its previously published history, which gives the blockchain a distributed nature and a tamper-evident design in combination with the open-source cryptographic hash function that links the blocks in a way that makes it makes it nearly impossible to alter a given block without also altering every subsequent block.

Step 6

Each Public Ballot Blockchain-Builder/Sequencer Computer [Unlimited #] (each with satellite internet connectivity, traditional internet connectivity, or Radio antenna connectivity), within seconds/minutes, receives each new stakeholder-encrypted BIDHP/BDHP (from the stakeholder Transmitting Ballot Scanners or other stakeholder Blockchain Builder Computers); validates the stakeholder-scanner digital signature on the unique publicly solvable cryptographic puzzle encrypting each new BIDHP/BDHP; transmits each new stakeholder-encrypted BIDHP/BDHP to other computers participating in the stakeholder Ballot Blockchain Network; decrypts each new BIDHP/BDHP (by either solving the cryptographic puzzle or obtaining the solution/decryption key from a stakeholder ballot blockchain); validates each new decrypted BIDHP/BDHP (using the Ballot Public Key and the Scanner Public Key); builds each new validated BIDHP/BDHP into a new block (one BIDHP/BDHP per block); and sequences, validates, and adds each block onto a separate Public Participant X Ballot Blockchain according to the open-source Ballot Blockchain-Building Software/rules agreed upon by all the stakeholders (thereby storing and publishing the primary/living copy of a public participant's Ballot Blockchain).

Note: Members of the public can enable their computers to participate in the Ballot Blockchain Network as Ballot Blockchain Builder Computers by downloading open-source Ballot Blockchain Builder Software from the Ballot Blockchain Network to their computers.

Note: Each Public Ballot Blockchain-Builder Computer follows the same open-source Ballot Blockchain Builder Software/rules (agreed upon by all the stakeholders) as the Stakeholder Ballot Blockchain-Builder Computers.

Note: The typical member of the public has only enough computer storage capability to build and maintain a BDHP-size blockchain (rather than a BIDHP-size blockchain), but they are given the data to build either type of blockchain.

Step 7:

Each Ballot Blockchain Validator Computer (belonging to the public or stakeholders) [Unlimited #] downloads a copy of a contending stakeholder Ballot Blockchain from a stakeholder Ballot Blockchain Server (within minutes/hours/days (depending on the number of blocks in the blockchain)); validates each historic block on the downloaded blockchain according to the Ballot Blockchain rules (within minutes/hours/days); receives and validates in near-real-time (NRT) each new block that was added onto the stakeholder Ballot Blockchain according to the Ballot Blockchain rules (within seconds); transmits each new, validated block to other computers participating in the stakeholder Ballot Blockchain Network (within seconds); adds each new, validated block to the validator's copy of the stakeholder Ballot Blockchain (within seconds); periodically (within minutes/hours/days) uses an open-source Ballot Blockchain Explorer (search engine) to search and compare all the contending Stakeholder Ballot Blockchains and then each automatically creates and publishes consolidated results on a 'Ballot-Blockchain-Errors Report/Webpage' that automatically creates and periodically updates 1) a list of validated BIDHPs/BDHPs that are missing on a given blockchain (evident because the BIDHPs/BDHPs are published on another contending stakeholder blockchain or because a blockchain has a Ballot ID #with BIDHPs/BDHPs from only one or some stakeholder scanners (rather than all of them) and 2) a list of any invalid BIDHPs/BDHPs that are published on the blockchain (which cannot happen with valid Ballot Blockchain Builder Software); and periodically (within minutes/hours/days) downloads and compare a blockchain's newly-published history to a previously-published history (that the Validator Computer downloaded), and if the histories don't match, then each Validator Computer automatically creates and publishes a 'Ballot-Blockchain-Errors Report/Webpage' that automatically creates and periodically updates 1) a list of validated BIDHPs/BDHPs that are missing on the blockchain's newly published history (evident because they were on the blockchain's previously published history) and 2) a list of any invalid BIDHPs/BDHPs that are published on the blockchain (which cannot happen with valid Ballot Blockchain Builder Software).

Note: A Validator Computer can validate just one or multiple stakeholder blackchins by downloading the software for the selected stakeholder blockchain(s).

Note: The typical member of the public has only enough computer storage capability to function as a validator for a BDHP-size blockchain (rather than a BIDHP-size blockchain), but they are given the data to validate either type of blockchain.

Note: Members of the public can enable their computers to participate in the Ballot Blockchain Network as Ballot Blockchain Validator Computers by downloading open-source Ballot Blockchain Validator Software from the Ballot Blockchain Network to their computers.

Step 8:

Each Ballot Blockchain Display Computer/Website (owned by the public or stakeholders) [Unlimited #], within minutes/hours/days, displays a 'Ballot-Blockchain-Explorer-Vote-Tallies Report/Webpage' that provides—the Date Time Group (DTG) of the report, the total number of registered/eligible voters; the tallies of votes for each candidate from every Ballot ID #that has unanimous agreement among its stakeholder-scanner-signed, blockchain-published, validated BIDHPs/BDHPs (on the voter selection data); the total number of ballots that would be required to overturn the election results; the tally of every Ballot ID #that lacks unanimous agreement among its stakeholder-scanner-signed blockchain-published, validated BIDHPs/BDHPs (on the voter selection data) (and are thus excluded in determining vote tallies); the tally of every Ballot ID #that has unanimous agreement among its stakeholder-scanner-signed blockchain-published, validated BIDHPs/BDHPs (on the voter selection data) (and are thus included in determining vote tallies).

Note: Each stakeholder website is required to display the 'Ballot-Blockchain-Explorer-Vote-Tallies Report/Webpage' according to the report format/template given in this voting system (agreed upon by stakeholders) and is required to display the open-source code of the Ballot-Blockchain Explorer Software that produced the vote tallies report.

Note: Members of the public can enable their computers to participate in the Ballot Blockchain Network as Ballot Blockchain Display Computers/Websites by downloading open-source Ballot-Blockchain Explorer Software from the Ballot Blockchain Network to their computers.

Step 9:

Each Stakeholder-Bidirectional/TCP-Inbound-Relay Computer [1 for each stakeholder] relays confirmations of BIDHP/BDHP additions on Stakeholder Ballot Blockchains received from the stakeholder Ballot Blockchain Builder Computers (in TCP/IP internet language) to each Stakeholder Green Light Verifying Scanners (in serial communication language) in the Ballot-Scanner-Set Assembly.

Note: Each Stakeholder X Bidirectional/TCP Inbound Relay Computer has minimal processing power and storage (to minimize malware threats from the internet).

Note: Each Stakeholder X Bidirectional/TCP Inbound Relay Computer is configured to receive only the blockchain confirmations and the information required to enable TCP/IP functionality (to minimize malware threats from the internet).

Step 10:

Each Stakeholder Green-Light-Verifying-Ballot Scanner (part of the Ballot-Scanner-Set Assembly), within 1 minute (likely ~45 seconds) of a voter feeding a ballot into the scanner set assembly, scans each paper ballot, and receives and displays confirmation on whether each BDHP (sent by the transmitting scanner) has been added to at least two stakeholder BDHP Ballot Blockchains.

Note: A green light indicates a ballot has been confirmed on at least two stakeholder blockchains within 1 minute (~45 seconds).

Note: A red light indicates a ballot has not been confirmed on at least two stakeholder blockchains within 1 minute.

Note: If the election observers, officials, and/or voter do not see a green light, then the voter can drop the ballot into a special ballot drop box that election officials can later count manually in the event of an audit under observation of election observers.

Note: Key features of each Stakeholder Green-Light-Verifying-Ballot Scanner: Is configured to receive only the blockchain confirmations. This configuration that permits only inbound data to the verifying scanner makes hacking the scanner much more difficult because hackers cannot get feedback from the scanner. Requires communication from the internet, so this verifying scanner is not connected to the transmitting scanner. (Thus, this communication from the internet to the verifying scanner does not compromise the transmitting scanner's physical barrier against receiving data from the internet). Is placed on a clear plastic platform and under observation by election officials and observers (along with the entire Ballot-Scanner-Set Assembly).

Step 11:

Each voter, within 1 minute (likely ~45 seconds) of a voter feeding a ballot into the scanner set assembly, can privately view their scanned ballot information on any stakeholder blockchain using any stakeholder blockchain display computer (with screen privacy guards) or on their personal device/phone (outside the voting booth)—in order to 1) verify their scanned ballot-images posted to the stakeholder blockchains and 2) provide a guard against voter intimidators and purchasers.

Note: Guard Against Voter Intimidators and Purchasers: Immediate viewing of the Ballot Blockchains enables a voter to find a ballot ID #with votes that match the selections directed by the voter intimidators and buyers, so the voter intimidators and buyers have no easy way to verify successful voter intimidation or purchases. (A blockchain explorer can enable voters to look at all the ballots cast at that polling station within the timeframe the voter spent in the polling station.)

Note: Since the stakeholder blockchain display computers would likely be targets of hackers to show false information, a warning would be displayed on each computer informing voters of that potential and that they can instead use a personal or other device to view their ballot image on the blockchain. Despite that risk, the polling station provides the blockchain display computers because they provide voters who do not have personal devices a potential guard against voter intimidators and purchasers, which is highly important for a free and fair election.

Note: If a voter is unable to find their ballot-information/BIDHP/BDHP on any of the stakeholder blockchains, or if a voter finds their ballot has been altered on a blockchain, then the voter can verbally inform an election official (under observation of election observers), who then increases the count of Date-Time-Group (DTG) tallies of voter-reports of ballots failing to post on any stakeholder blockchain to a running paper list that the state maintains respectively on either a paper report entitled 'Voter-Reports of Ballots Failing to Post on Any Stakeholder Blockchain' or 'Voter-Reports of Altered-Ballots Posting to the Blockchain' respectively according to the report format/template given in this voting system (agreed upon by the stakeholders).

In the above report: the election official does not place the voter's name on the list in the report; the election official places the Date-Time-Group (DTG) of voter-reported failures and the election official's signature next to the DTG on the list in the report; and this type of report is maintained at every polling station under observation of election observers, and a given polling station might have several election officials who are available simultaneously to fill out one these reports/lists, so voters do not need to wait for extended periods in line to give their report.

If the total number of DTGs (with election official signatures) on all these reports exceeds the total number of votes that would be required to overturn the election results, then the state conducts an audit that compares the paper ballots to their BIDHPs/BDHPs on the stakeholder blockchains and/or conducts a hand-recount of the paper ballots.
PHASE 2: Vote Counting Phase:
Step 12:

Either during or after the vote casting phase, election auditors (under observation by election observers) conduct audits that compare paper ballots and their BIDHPs/BDHPs on the stakeholder blockchains and then ensure vote tallies are manually adjusted appropriately-under the following conditions (previously discussed in other steps):
Condition 1:

The election observers, officials, and/or voter do not see a green light on the Green-Light-Verifying Scanner within ~1 min after the voter sends their ballot through the Ballot-Scanner-Set Assembly, and the voter drops the ballot into a Ballot-Audit-Drop Box (designated for auditors to later count manually in the event of an audit under observation of election observers).

The audit is optional during the election-auditors can conduct the audit on just paper ballots cast into the Ballot-Audit-Drop Box.

The audit is required after the election (for all paper ballots)—if the total number of paper ballots cast into all the Ballot-Audit-Drop Boxes exceeds the total number of votes that would be required to overturn the election results.
Condition 2

A voter verbally informs a polling station election official that they are unable to find their ballot-information/BIDHP/BDHP on any of the stakeholder blockchains or they find their ballot has been altered on a blockchain.

The audit is optional during the election-auditors can conduct the audit on just paper ballots cast during a given timeframe surrounding the Date-Time-Group (DTG) of the voter-verbal report to check for other irregularities during that selected timeframe.

The audit is required after the election (for all paper ballots)—if the total number of DTGs (with election official signatures) on all the 'Voter-Reports of Ballots Failing to Post on Any Stakeholder Blockchain' and 'Voter-Reports of Altered-Ballots Posting to the Blockchain' exceeds the total number of votes that would be required to overturn the election results. Condition 3:

The Ballot-Blockchain Explorer Software reports that a BIDHP/BDHP is labeled "invalid" or "undetermined and flagged for investigation" on a 'Ballot-Blockchain-Explorer-Vote-Tallies Report/Webpage.'

The audit is optional during the election-auditors can conduct the audit on any BIDHPs/BDHPs labeled "invalid" or "undetermined and flagged for investigation" on a during-election "Ballot-Blockchain-Explorer-Vote-Tallies Report/Webpage.'

The audit is required after the election (for all "invalid" and "undetermined" BIDHPs/BDHPs)—if the total number of BIDHPs/BDHPs labeled "invalid" and/or "undetermined" on a post-election 'Ballot-Blockchain-Explorer-Vote-Tallies Report/Webpage' exceeds the total number of votes that would be required to overturn the election results.

Note: The Ballot-Blockchain Explorer Software will label a BIDHP/BDHP as "invalid" on a 'Ballot-Blockchain-Explorer-Vote-Tallies Report/Webpage' if the BIDHP/BDHP lacks a valid Ballot Private Key and/or a validated Scanner Private Key.

A Ballot Blockchain would have to be using corrupted Ballot-Blockchain-Building Software for this to happen, and since the Ballot-Blockchain-Building Software is required to be open source, the corruption would be visible to all.

If any "invalid" BIDHPs/BDHPs appear on a 'Ballot-Blockchain-Explorer-Vote-Tallies Report/Webpage' (of a Stakeholder Ballot Blockchain), then auditors 1) reject the entire corresponding Stakeholder Ballot Blockchain and 2) flag the entire corresponding Stakeholder Ballot Blockchain and its Ballot-Blockchain-Building Software for investigation into election tampering.

Note: The Ballot-Blockchain Explorer Software will label a BIDHP/BDHP as "undetermined and flagged for investigation" on a 'Ballot-Blockchain-Explorer-Vote-Tallies Report/Webpage' if any of the stakeholder-scanner-signed, blockchain-published, validated BIDHPs/BDHPs for a given Ballot ID #lack unanimous agreement on their recorded ballot-selection data.

If any "undetermined BIDHP/BDHP" (that has validated digital signatures but lack unanimous agreement with any of the other blockchain-published BIDHPs/BDHPs with the same Ballot ID #) is proven to be a "paper-audit-validated BIDHP/BDHP" that matches the paper ballot with the same Ballot ID #in the state's holdings, then election auditors 1) manually convert the "undetermined BIDHP/BDHP" label to a "paper-audit-validated BIDHP/BDHP" label and 2) manually add the BIDHPs/BDHPs to the vote tallies on a manually-updated 'Ballot-Blockchain-Explorer-Vote-Tallies Report/Webpage.'

If any "undetermined BIDHP/BDHP" (that has validated digital signatures but lack unanimous agreement with any of the other blockchain-published BIDHPs/BDHPs with the same Ballot ID #) is proven to be an erroneous BIDHP/BDHP (due to an ambiguously-marked paper ballot) or a fraudulent BIDHP/BDHP (because the BIDHP/BDHP does not match the paper ballot with the corresponding Ballot ID #in the state's holdings-either because the BIDHP/BDHP was created without a paper ballot, or was created from an altered-voter-cast paper ballot, or was created from a stollen-uncast paper ballot), then 1) election auditors manually convert the "undetermined BIDHP/BDHP" label to an "erroneous/fraudulent BIDHP/BDHP" label and 2) the BIDHP/BDHP remains excluded from the vote tallies on a manually-updated 'Ballot-Blockchain-Explorer-Vote-Tallies Report/Webpage.'

Note: It would be extremely difficult for bad actors to cast fraudulent BIDHPs/BDHPs onto a Ballot Blockchain that wouldn't be cast aside (discounted) as "undetermined BIDHPs/BDHPs," "fraudulent BIDHPs/BDHPs," or "invalid BIDHP/BDHPs" by the 'Ballot-Blockchain-Explorer-Vote-Tallies Report/Webpage' because the bad actors would need to steel both paper ballots (not only the paper Ballot Private Keys) and multiple stakeholder transmitting scanners (or scanner private keys)—one from every stakeholder-without the stakeholders, election officials, or election observers noticing.

Stealing the Ballot Private Keys rather than the paper ballots would 1) not suffice because the legitimate-voter-marked paper ballots for the corresponding Ballot ID #s would create conflicting BIDHPs/BDHPs, which would cause all the validated BIDHPs/BDHPs to be cast aside as "undetermined BIDHPs/BDHPs" and 2) be nearly impossible because a) the Ballot Private Key is shredded off the bottom section of a ballot when a voter sends the ballot through the Ballot-Scanner-Set Assembly and b) all Ballot Private Keys are deleted from the Ballot Smart Printer that created them after all the election ballots are printed.

Stealing uncast-paper ballots that still have their Ballot Private Keys would not suffice because the Ballot-Blockchain-Building Software and the Ballot-Blockchain-Explorer-Vote-Tally-Report Software would also require valid stakeholder Scanner Private Keys-one from every stakeholder—otherwise the BIDHP/BDHP would be rejected as invalid by legitimate Ballot Blockchain-Building software or labeled as "invalid" on a 'Ballot-Blockchain-Explorer-Vote-Tallies Report/Webpage' that was generated from a Ballot Blockchain built by corrupted Ballot Blockchain-Building Software that permitted a BIDHP/BDHP onto the Ballot Blockchain without valid stakeholder Scanner Private Keys.

Stealing Scanner Private Keys would be extremely difficult because they are protected on the scanners by "hard wallet" technology (hardware and software) that has not been hacked, and the manufacturers of this technology were selected by each competing stakeholder and entered into contract with the stakeholders to create secure technology or pay a fine that is set to a number that game theory says would be nearly impossible for a bad actor to compromise.

Stealing multiple stakeholder scanners—one from every stakeholder—without any of the stakeholders, election officials, or election observers noticing is extremely unlikely.

Note: It would be extremely difficult for bad actors to cause the fraudulent type of "undetermined BIDHPs/BDHPs" on a Ballot Blockchain to pass an election audit because—1) the bad actors would need to steel both paper ballots and multiple stakeholder transmitting scanners (or scanner private keys)—one from every stakeholder—without any of the stakeholders, election officials, or election observers noticing, and 2) they would need to put their fraudulent-voter-marked paper ballots into the state's custody with the other legitimate-voter-marked paper ballots, and 3) they would need to remove the corresponding-legitimate-voter-marked paper ballots from the states holdings.

Note: Any "Undetermined BIDHPs/BDHPs" (that have valid digital signatures but lack unanimous agreement with any of the other BIDHPs/BDHPs with the same Ballot ID #), and any "erroneous/fraudulent BIDHPs/BDHPs" (that have valid digital signatures but do not match the paper ballot), and any "invalid BIDHPs/BDHPs" (that lack a valid Ballot Private Key digital signature and a valid Scanner Private Key digital signature) [which would require the Ballot Blockchain to be using corrupted Ballot-Blockchain-Building Software], should not be removed from a blockchain's history because a blockchain history should not be changed, because the open-source Ballot Blockchain Explorer and auditors will simply discount any undetermined, erroneous/fraudulent, and invalid BIDHPs/BDHPs in determining the vote tallies, and because they are evidence for investigations into election tampering.

Note: To aid the investigation into any "undetermined BIDHP/BDHP" or any "invalid BIDHP/BDHP," the state can offer a reward to anyone who can provide proof of which of any conflicting BIDHPs/BDHPs is invalid and/or proof of how it was cast, and/or proof of who is responsible for casting it.

Step 13:

The state, the interested political parties, and the public use this voting system open-source Ballot-Blockchain-Explorer Software (and/or any open-source code blockchain explorers/software) to count the ballots and the votes for each candidate.

Step 14:

The state, the interested political parties, and the public verify that there are not more ballots on the blockchain than there are eligible voters in the state.

Step 15:

The state, the interested political parties, and the public compare vote tallies and use the transparency of the blockchain and the open-source code of blockchain explorers/software to enable disputes/discrepancies to be resolved transparently and accurately.

Detailed Description of Hardware/Equipment (including the hardware in the 'Paper-Ballot-to-Blockchain Voting Kit')

Custom-built 'Ballot Smart Printer' [1 primary and 1 backup, the state selects the vendor, Part of the 'Paper-Ballot-to-Blockchain Voting Kit']—Enables the state to design and print ballots on a computer-printer pair that prints only the number of ballots equal to the number of registered/eligible voters plus a selected percentage of ballots, such as 5% (to cover ballot loss, damage, or theft), which are safeguarded in a special batch that is only used and considered valid if the state makes an official finding that a specified number of the extra ballots are needed Creates and prints, on the top section of each ballot, a unique, human-readable Ballot ID #(that is NOT linked to a human identity) [from a sequenced set of numbers corresponding to the total number of registered/eligible voters used to verify that the total number of cast ballots does not exceed the total number of registered/eligible voters] and a unique, human-readable Ballot Public Key [used to validate the authenticity of a scanned ballot image or a scanned ballot data file by validating its digital signature produced by a Ballot Private Key], which are published by the stakeholders to the public before the election in a pre-election publication that lists all the Ballot ID #s and corresponding Ballot Public Keys for the upcoming election. Creates and prints, on the bottom section of each ballot, a unique non-human-readable Ballot Private Key in the form of a QR code, which is not published, so it can be used to create a digital signature for a scanned ballot image that is validated by the Ballot Public Key. Prints, folds, and seals each ballot so the content is concealed on the inside of the fold in a tamper-evident way. Assigns groups of sequential ballots to batch ID #s and assigns each batch ID #to a polling station, (which the state publishes to the public before the election so that if officials discover a compromised ballot, they all know from which batch it came). Shuffles the ballots in each batch (so voters can maintain anonymity). Deletes the ballot private keys from the computer-printer pair memory after the ballots have been printed. Has no internet connection ability. Will need to be protected with the same level of security as money printers—to thwart fraud. Is placed on a clear plastic platform and under observation by election officials and observers.

Custom-built 'Ballot-Scanner-Set Assembly' (that enables a paper ballot to be scanned, read, and transmitted (as a ballot image and hash) by all devices in the assembly when a voter feeds a paper ballot into the scanner set assembly). Quantity required to support the voting population. All stakeholders agree on a single vendor. Part of the 'Paper-Ballot-to-Blockchain Voting Kit'. Enables a paper ballot to be scanned, read, and transmitted (as a BIDHP and a BDHP) by all 'Stakeholder-Transmitting-Ballot Scanners' in the assembly when a voter feeds a paper ballot into the scanner set assembly. Consists of a scanner pair from each stakeholder (which consists of a 'Stakeholder-Transmitting-Ballot Scanner' and a 'Stakeholder-Green-Light-Verifying Scanner') and a shredder (located at the end of the 'Ballot-Scanner-Set Assembly').

Stakeholder Scanner Pair [1 per stakeholder], 'Stakeholder-Transmitting-Ballot Scanner', 1 per stakeholder], (Each stakeholder selects its own vendor), 'Stakeholder-Green-Light-Verifying Scanner', [1 per stakeholder], (Each stakeholder selects its own vendor). Shredder located at the end of the Ballot-Scanner-Set Assembly (to shred the bottom section of the ballot that has the Ballot Private Key, so no one can later edit the paper ballot and re-scan and re-sign it with the ballot private key), [1 per 'Ballot-Scanner-Set Assembly'], (All stakeholders agree on a single vendor). Is placed on a clear plastic platform and under observation by election officials and observers.

Stakeholder-Transmitting-Ballot Scanner, Part of the 'Ballot-Scanner-Set Assembly', 1 per stakeholder in a 'Ballot-Scanner-Set Assembly, Part of Stakeholder Scanner Pair in a 'Ballot-Scanner-Set Assembly', Each stakeholder selects its own vendor, Part of the 'Paper-Ballot-to-Blockchain Voting Kit', within seconds of a voter feeding a ballot into the scanner set assembly, each Stakeholder Transmitting-Ballot Scanner scans each paper ballot; creates a ballot-image excluding the Ballot Private Key [~1 MB of data]; creates a ballot-image hash [~32 bytes of data] (using an open-source cryptographic hash function that enables all stakeholders and the public to validate that the ballot image and the ballot-image-hash pass a data match check); records the ballot-voter-selection data [10 bytes-4 KB of data]; stores them together as a ballot-image-data-hash pack (BIDHP) [~1 MB of data]; stores just the ballot-voter-selection data and the ballot-image hash as a ballot-data-hash pack (BDHP) [~5 KB of data]; digitally signs both the BIDHP and BDHP separately using the Ballot Private Key and the Scanner Private Key [~64 bytes of data]; encrypts separately both the BIDHP and BDHP using a unique scanner-created-and-signed cryptographic puzzle [~80 bytes for the cryptographic puzzle and ~32 bytes for the scanner digital signature, totaling ~112 bytes of data] (which would require malware infection on internet routers seeking to decrypt and perform keyword censorship of ballots to accomplish the complex task of solving a cryptographic puzzle, which would function as a deterrent because it may require more processing power and money in extra electricity than many routers have at their disposal); shreds the portion of the ballot with the ballot private key (after the scan is completed so no one can later edit the paper ballot and re-scan and re-sign it with the ballot private key); and transmits the signed, encrypted BIDHP [~1 MB of data] and the signed, encrypted BDHP [~5 KB of data] separately (redundantly through all the connected 'Stakeholder Bidirectional/TCP and Unidirectional/UDP Outbound Relay Computers' and redundantly through multiple satellite internet ISPs, multiple traditional internet ISPs, and multiple UHF/VHF/HF radio antennas) to all the Stakeholder Ballot Blockchain Builder Computers, which are viewable on the public internet.

Has only unidirectional diodes at every data port that physically only permit data to exit (not enter) the scanner. Has three settings for transmitting the history of stored BIDHPs/BDHPs: 1) do not transmit history now, 2) transmit history once now, or 3) transmit history continuously. The vote(s) on each ballot (which has a valid, unique ballot ID #) will only be counted once by the open-source Ballot Blockchain Explorer Software (search engine). Is placed on a clear plastic platform and under observation by election officials and observers. Note: If a stakeholder scanner or a stakeholder blockchain tries to employ keyword censorship on an opposing ballot's BIDHPs/BDHPs, the censorship will 1) likely be ineffective because the opposing stakeholder has incentive to publish those opposing BIDHPs/BDHPs on its blockchain and 2) be evident because the public and all the stakeholders will be able to see (on the contending stakeholder ballot blockchains) that one or more of the validated BIDHPs/BDHPs for a particular opposing Ballot ID #are missing on a particular blockchain, while the other(s) are published on the same blockchain or different blockchains. Is placed on a clear plastic platform and under observation by election officials and observers.

Stakeholder-Green-Light-Verifying Scanner, Part of the 'Ballot-Scanner-Set Assembly, 1 per stakeholder in a 'Ballot-Scanner-Set Assembly, Part of Stakeholder Scanner Pair in a 'Ballot-Scanner-Set Assembly', Each stakeholder selects its own vendor, Part of the 'Paper-Ballot-to-Blockchain Voting Kit', Within 1 minute (likely ~45 seconds) of a voter feeding a ballot into the scanner set assembly, each stakeholder verifying scanner scans each paper ballot and receives and displays confirmation on whether each BIDHP/BDHP (sent by the transmitting scanner) has been added to at least two stakeholder BIDHP/BDHP Ballot Blockchains.

Green light indicates a ballot has been confirmed on at least two stakeholder blockchains within 1 minute (likely ~45 seconds). Red light indicates a ballot has not been confirmed on at least two stakeholder blockchains within 1 minute. If the election observers, officials, and/or voter do not see a green light, then the voter can drop the ballot into a special ballot drop box that election officials can later count manually in the event of an audit under observation of election observers. Configured to receive only the blockchain confirmations. This configuration that permits only inbound data to the verifying scanner makes hacking the scanner much more difficult because hackers cannot get feedback from the scanner. Requires communication from the internet, so this verifying scanner is not connected to the transmitting scanner. (Thus, this communication from the internet to the verifying scanner does not compromise the transmitting scanner's physical barrier against receiving data from the internet). Is placed on a clear plastic platform and under observation by election officials and observers.

Shredder [Part of the 'Ballot-Scanner-Set Assembly'], [1 per 'Ballot-Scanner-Set Assembly'], (All stakeholders agree on a single vendor), [Part of the 'Paper-Ballot-to-Blockchain Voting Kit']. Used to shred the bottom section of the ballot that has the Ballot Private Key, so no one can later edit the paper ballot and re-scan and re-sign it with the ballot private key. Shredder is located at the end of the 'Ballot-Scanner-Set Assembly.'

Custom-built 'Stakeholder-Bidirectional/TCP—Outbound-Relay Computer', [1 for each stakeholder], (Each stakeholder selects its own vendor), [Part of the 'Paper-Ballot-to-Blockchain Voting Kit']. Relays encrypted, digitally signed BIDHPs and BBDHPs received from EVERY transmitting scanner (in serial communication language) to their public internet destinations (in TCP/IP or UDP/IP internet language). Has a static IP address. Has minimal processing power and storage (to minimize malware threats from the internet). TCP/Bidirectional Version: Has firewall software and is configured to only receive data from the internet that is required to enable TCP/IP functionality (to minimize malware threats from the internet). Is placed on a clear plastic platform and under observation by election officials and observers.

Custom-built 'Stakeholder-Unidirectional/UDP-Outbound-Relay Computer', [1 for each stakeholder], (Each stakeholder selects its own vendor), [Part of the 'Paper-Ballot-to-Blockchain Voting Kit']. Relays encrypted, digitally signed BIDHPs and BBDHPs received from EVERY transmitting scanner (in serial communication language) to their public internet destinations (in TCP/IP or UDP/IP internet language). Has a static IP address. Has minimal processing power and storage (to minimize malware threats from the internet). UDP/Unidirectional Version: Has only unidirectional data diodes at every outbound data port that provide physical firewalls that guarantee data can only exit (not enter) the outbound relay computer at the data ports. connected to the internet. Is placed on a clear plastic platform and under observation by election officials and observers.

Custom-built 'Stakeholder-Bidirectional/TCP—Inbound Relay Computer' [1 for each stakeholder, each stakeholder selects its own vendor, Part of the 'Paper-Ballot-to-Blockchain Voting Kit']. Relays confirmations of BIDHP additions on Stakeholder Ballot Blockchains received from the stakeholder Ballot Blockchain Builder Computers (in TCP/IP internet language) to the Green Light Verifying Scanner (in serial communication language). Has minimal processing power and storage (to minimize malware threats from the internet). Is configured to receive only the blockchain confirmations and the information required to enable TCP/IP functionality (to minimize malware threats from the internet). Is placed on a clear plastic platform and under observation by election officials and observers.

Commercial, off-the-self modem (without a router), [>3 for each relay computer for redundancy], [Part of the 'Paper-Ballot-to-Blockchain Voting Kit'], Two types set up: Modems (without a router) to Multiple Traditional Internet ISPs [>3 Modems for redundancy]. Enables wired and wireless transmissions to the traditional internet and computers participating in the Ballot Blockchain Network. Router is excluded because it would create a critical vulnerability to keyword censorship that can prevent ballots from reaching the multiple ISPs and public devices on the internet, and it is not needed for IP assignment, DNS lookup, or firewall protection. Modems (without a router) to Multiple Satellite Internet ISPs. Enables wireless transmissions to satellite internet and computers participating in the ballot Blockchain Network. Router is excluded for the reasons previously given.

Commercial, off-the-self modem (with a router), [>3 for each relay computer for redundancy], [Part of the 'Paper-Ballot-to-Blockchain Voting Kit'], Two types set up: Enables receipt of inbound data from wireless connections from Stakeholder Ballot Blockchain Builder Computers (connected to satellite internet) to the Stakeholder-Bidirectional/TCP-Inbound-Relay Computers in the polling stations. Enables receipt of inbound data from traditional internet to the Stakeholder Ballot-Blockchain-Display Computers/Websites located in the polling stations.

Commercial, off-the-self satellite-internet antenna, [1 for each Satellite Internet Service Provider (ISP) at a polling station], [Part of the 'Paper-Ballot-to-Blockchain Voting Kit']. Transmitting & Receiving Antennas to Multiple Satellite Internet Networks: One of three types of outbound and inbound data paths that provides redundancy in case of failures or censorship on the other paths.

Commercial, off-the-self UHF/VHF/HF radio antenna, [Two of each at a polling station-one dedicated to transmitting and one dedicated to receiving], [Part of the 'Paper-Ballot-to-Blockchain Voting Kit']. Two types set up: Transmitting UHF/VHF/HF Radio Antennas. Enables wireless radio antenna transmissions to devices with a UHF/VHF/HF receiving antenna, including computers participating in the Ballot Blackchin network or internet routers. Receiving UHF/VHF/HF Radio Antenna. Enables receipt of inbound data via wireless connections from Stakeholder Ballot Blockchain Builder Computers connected to radio antennas.

Commercial, off-the-self computer used as 'Stakeholder-Ballot-Blockchain-Builder (Sequencer) Computer', [>5 for each stakeholder (with the goal of ensuring at least one is always operational)], (Each stakeholder selects its own vendor), [Not part of the 'Paper-Ballot-to-Blockchain Voting Kit']. Within ~45 seconds, receives separately each new stakeholder-encrypted BIDHP and BDHP (from all the stakeholder Transmitting Ballot Scanners); validates separately the stakeholder-scanner digital signature on the unique cryptographic puzzle encrypting separately each new BIDHP and each new BDHP; transmits separately each new stakeholder-encrypted BIDHP and BDHP to other computers participating in the stakeholder Ballot Blockchain Network; decrypts separately each new BIDHP and BDHP (by solving each cryptographic puzzle within ~40 seconds each); validates separately each new decrypted BIDHP and BDHP (using the Ballot Public Key and the Scanner Public Key); builds each new validated BIDHP into a new block for a stakeholder BIDHP Ballot Blockchain (one BIDHP per block) (eventually creating a 120 TB blockchain if each block is ~1 MB and there are 40,000,000 ballots, each transmitted three times, each via a stakeholder signed BIDHP); builds each new validated BDHP into a new block for a separate stakeholder BDHP Ballot Blockchain (one BDHP per block) (eventually creating a 600 MB blockchain if each block is ~5 KB and there are 40,000,000 ballots, each transmitted three times, each via a stakeholder signed BDHP); and sequences, validates, and adds each BIDHP block onto a stakeholder BIDHP Ballot blockchain (on the Stakeholder's Ballot Blockchain Server) and sequences, validates, and adds each BDHP block onto a stakeholder BDHP Ballot blockchain (on the Stakeholder's Ballot Blockchain Server) according to the open-source Ballot Blockchain-Building Software/rules agreed upon by all the stakeholders.

Each stakeholder is required to build both a Stakeholder BIDHP Ballot Blockchain or a Stakeholder BDHP Ballot Blockchain because the typical member of the public has only enough computer storage capability to act as a validator for a BDHP-size blockchain. When computer data storage capability increases sufficiently, then only BIDHP Ballot Blockchains will be necessary.)

Each Stakeholder's Ballot Blockchain is compared to the other Stakeholder Ballot Blockchains—by Validator Computers that check data integrity, publish Blockchain Errors Repot Webpages about blockchains that violated the rules, and thus help ensure every valid ballot is counted.

Each Blockchain Builder Computer has extremely high processing power (hash rate), so it can decrypt the BIDHP/BDHP Cryptographic Puzzle within ~40 seconds, much faster than most computers.

Has satellite internet connectivity, traditional internet connectivity, and Radio antenna connectivity.

Commercial, off-the-self sever used as 'Stakeholder-Ballot-Blockchain Server', [1 for each stakeholder (to store the primary/living copy of a stakeholder's Ballot Blockchain)], (Each stakeholder selects its own vendor), [Not part of the 'Paper-Ballot-to-Blockchain Voting Kit']. Stores the primary/living copy of a stakeholder's Ballot Blockchain. Has satellite internet connectivity, traditional internet connectivity, or Radio antenna connectivity.

Commercial, off-the-self computer used as 'Public-Ballot Blockchain-Builder Computers', [Unlimited #], [Not part of the 'Paper-Ballot-to-Blockchain Voting Kit'], Within seconds/minutes, receives each new stakeholder-encrypted BIDHP/BDHP (from the stakeholder Transmitting Ballot Scanners or other stakeholder Blockchain Builder Computers); validates the stakeholder-scanner digital signature on the unique cryptographic puzzle encrypting each new BIDHP/BDHP; transmits each new stakeholder-encrypted BIDHP/BDHP to other computers participating in the stakeholder Ballot Blockchain Network; decrypts each new BIDHP/BDHP (by either solving the cryptographic puzzle or obtaining the solution/decryption key from a stakeholder ballot blockchain); validates each new decrypted BIDHP/BDHP (using the Ballot Public Key and the Scanner Public Key); builds each new validated BIDHP/BDHP into a new block (one BIDHP/BDHP per block); and sequences, validates, and adds each block onto a separate Public Participant X Ballot Blockchain according to the open-source Ballot Blockchain-Building Software/rules agreed upon by all the stakeholders (thereby storing and publishing the primary/living copy of a public participant's Ballot Blockchain).

Note: The typical member of the public has only enough computer storage capability to build and maintain a BDHP-size blockchain (rather than a BIDHP-size blockchain), but they are given the data to build either type of blockchain. Note: Members of the public can enable their computers to participate in the Ballot Blockchain Network as Ballot Blockchain Builder Computers by downloading open-source Ballot Blockchain Builder Software from the Ballot Blockchain Network to their computers. Has satellite internet connectivity, traditional internet connectivity, or Radio antenna connectivity.

Commercial, off-the-self computer used as 'Stakeholder-Ballot-Blockchain-Validator Computers', [Unlimited #], [Not part of the 'Paper-Ballot-to-Blockchain Voting Kit']. Downloads a copy of a contending stakeholder Ballot Blockchain from a stakeholder Ballot Blockchain Server (within minutes/hours/days (depending on the number of blocks in the blockchain)); validates each historic block on the downloaded blockchain according to the Ballot Blockchain rules (within minutes/hours/days); receives and validates in near-real-time (NRT) each new block that was added onto the stakeholder Ballot Blockchain according to the Ballot Blockchain rules (within seconds); transmits each new, validated block to other computers participating in the stakeholder Ballot Blockchain Network (within seconds); adds each new, validated block to the validator's copy of the stakeholder Ballot Blockchain (within seconds); periodically (within minutes/hours/days) uses an open-source Ballot Blockchain Explorer (search engine) to search and compare all the contending Stakeholder Ballot Blockchains and then each automatically creates and publishes consolidated results on a Blockchain Errors Report Webpage that automatically creates and periodically updates 1) a list of validated BIDHPs/BDHPs that are missing on a given blockchain (evident because the BIDHPs/BDHPs are published on another contending stakeholder blockchain or because a blockchain has a Ballot ID #with BIDHPs/BDHPs from only one or some stakeholder scanners (rather than all of them) and 2) a list of any invalid BIDHPs/BDHPs that are published on the blockchain (which cannot happen with valid Ballot Blockchain Builder Software); and periodically (within minutes/hours/days) downloads and compare a blockchain's newly-published history to a previously-published history (that the Validator Computer downloaded), and if the histories don't match, then each Validator Computer automatically creates and publishes a Blockchain Errors Report Webpage that automatically creates and periodically updates 1) a list of validated BIDHPs/BDHPs that are missing on the blockchain's newly published history (evident because they were on the blockchain's previously published history) and 2) a list of any invalid BIDHPs/BDHPs that are published on the blockchain (which cannot happen with valid Ballot Blockchain Builder Software). Note: A Validator Computer can validate just one or multiple stakeholder blackchins by downloading the software for the selected stakeholder blockchain(s).

Commercial, off-the-self computer used as "Public-Ballot-Blockchain-Validator Computers', [Unlimited #], [Not part of the 'Paper-Ballot-to-Blockchain Voting Kit']. Downloads a copy of a contending stakeholder Ballot Blockchain from a stakeholder Ballot Blockchain Server (within minutes/hours/days (depending on the number of blocks in the blockchain)); validates each historic block on the downloaded blockchain according to the Ballot Blockchain rules (within minutes/hours/days); receives and validates in near-real-time (NRT) each new block that was added onto the stakeholder Ballot Blockchain according to the Ballot Blockchain rules (within seconds); transmits each new, validated block to other computers participating in the stakeholder Ballot Blockchain Network (within seconds); adds each new, validated block to the validator's copy of the stakeholder Ballot Blockchain (within seconds); periodically (within minutes/hours/days) uses an open-source Ballot Blockchain Explorer (search engine) to search and compare all the contending Stakeholder Ballot Blockchains and then each automatically creates and publishes consolidated results on a Blockchain Errors Report Webpage that automatically creates and periodically updates 1) a list of validated BIDHPs/BDHPs that are missing on a given blockchain (evident because the BIDHPs/BDHPs are published on another contending stakeholder blockchain or because a blockchain has a Ballot ID #with BIDHPs/BDHPs from only one or some stakeholder scanners (rather than all of them) and 2) a list of any invalid BIDHPs/BDHPs that are published on the blockchain (which cannot happen with valid Ballot Blockchain Builder Software); and periodically (within minutes/hours/days) downloads and compare a blockchain's newly-published history to a previously-published history (that the Validator Computer downloaded), and if the histories don't match, then each Validator Computer automatically creates and publishes a Blockchain Errors Report Webpage that automatically creates and periodically updates 1) a list of validated BIDHPs/BDHPs that are missing on the blockchain's newly published history (evident because they were on the blockchain's previously published history) and 2) a list of any invalid BIDHPs/BDHPs that are published on the blockchain (which cannot happen with valid Ballot Blockchain Builder Software).

Note: A Validator Computer can validate just one or multiple stakeholder blackchins by downloading the software for the selected stakeholder blockchain(s). Note: The typical member of the public has only enough computer storage capability to function as a validator for a BDHP-size blockchain (rather than a BIDHP-size blockchain), but they are given the data to validate either type of blockchain. Note: Members of the public can enable their computers to participate in the Ballot Blockchain Network as Ballot Blockchain Validator Computers by downloading open-source Ballot Blockchain Validator Software from the Ballot Blockchain Network to their computers.

Commercial, off-the-self computer used as 'Stakeholder-Ballot-Blockchain-Display Websites/Computers, [[Unlimited #], [Some are part of the 'Paper-Ballot-to-Blockchain Voting Kit' located inside a polling station, and some are not], Within ~45 seconds of a voter feeding a ballot into the scanner set assembly, enables voters to privately view their scanned ballot information on any stakeholder blockchain using any stakeholder blockchain display computer (with screen privacy guards) [or on their personal device/phone (outside the voting booth)]-in order to 1) verify their scanned ballot-images posted to the stakeholder blockchains and 2) provide a guard against voter intimidators and purchasers. Provides a Guard Against Voter Intimidators and Purchasers: Immediate viewing of the Ballot Blockchains enables a voter to find a ballot ID #with votes that match the selections directed by the voter intimidators and buyers, so the voter intimidators and buyers have no easy way to verify successful voter intimidation or purchases. (A blockchain explorer can enable voters to look at all the ballots cast at that polling station within the timeframe the voter spent in the polling station.)

Since the stakeholder blockchain display computers would likely be targets of hackers to show false information, a warning would be displayed on each computer informing voters of that potential and that they can instead use a personal or other device to view their ballot image on the blockchain. Despite that risk, the polling station provides the blockchain display computers because they provide voters who do not have personal devices a potential guard against voter intimidators and purchasers, which is highly important for a free and fair election.

Within minutes/hours/days, displays a "Vote Tally Report" that provides—the Date Time Group (DTG) of the report, the total number of registered/eligible voters; the tallies of votes for each candidate from every Ballot ID #that has unanimous agreement among its stakeholder-scanner-signed, blockchain-published, validated BIDHPs/BDHPs (on the voter selection data); the total number of ballots that would be required to overturn the election results; the tally of every Ballot ID #that lacks unanimous agreement among its stakeholder-scanner-signed blockchain-published, validated BIDHPs/BDHPs (on the voter selection data) (and are thus excluded in determining vote tallies); the tally of every Ballot ID #that has unanimous agreement among its stakeholder-scanner-signed blockchain-published, validated BIDHPs/BDHPs (on the voter selection data) (and are thus included in determining vote tallies). Is placed on a clear plastic platform and under observation by election officials and observers if it is located inside a polling station.

Commercial, off-the-self computer used as 'Public-Ballot-Blockchain-Display Websites/Computers', [Unlimited #], [Not part of the 'Paper-Ballot-to-Blockchain Voting Kit'], Within minutes/hours/days, displays a "Vote Tally Report" that provides—the Date Time Group (DTG) of the report, the total number of registered/eligible voters; the tallies of votes for each candidate from every Ballot ID #that has unanimous agreement among its stakeholder-scanner-signed, blockchain-published, validated BIDHPs/BDHPs (on the voter selection data); the total number of ballots that would be required to overturn the election results; the tally of every Ballot ID #that lacks unanimous agreement among its stakeholder-scanner-signed blockchain-published, validated BIDHPs/BDHPs (on the voter selection data) (and are thus excluded in determining vote tallies); the tally of every Ballot ID #that has unanimous agreement among its stakeholder-scanner-signed blockchain-published, validated BIDHPs/BDHPs (on the voter selection data) (and are thus included in determining vote tallies).

Note: Members of the public can enable their computers to participate in the Ballot Blockchain Network as Ballot Blockchain Display Computers/Websites by downloading open-source Ballot Blockchain Explorer Software from the Ballot Blockchain Network to their computers.

The above embodiments have been described for a paper ballot; however, it is to be noted that the embodiments can also be applied to any paper document.

Referring to FIG. 1 which is an environmental diagram of the disclosed apparatus. The apparatus may include a printer 100 for printing the paper ballot as described in above embodiments. The printer may include a sealer for folding and sealing the printed paper ballot. The apparatus may also include a scanning assembly 120, the scanner assembly may include a scanner 130 for scanning and reading the paper ballot, a shredder 140 for shredding the shreddable section of the paper ballot, and a transmitter 150 for sending the datafile generated by the scanner from the paper ballot to an external server 170. The external server may be connected through network 160, both the external server and network has been described in above embodiments and hence not repeated here. The server can be connected to a database, such as a blockchain database. The databases have been described in the above embodiments.

What is claimed is:
1. A document security method comprising:
printing a paper document, wherein the paper document comprises:
   a main section and a shreddable section,
   the main section comprises a document data, and
   the shreddable section comprises a document private key of a document public and private key pair;
scanning and reading the main section of the paper document, by a scanner device to generate an unsigned datafile;

upon scanning the main section, reading by the scanner device, the document private key from the shreddable section; and digitally signing the unsigned datafile using the document private key to generate a document-signed datafile, wherein the scanner device comprises a plurality of scanners, wherein the plurality of scanners is operated independently by a plurality of competing stakeholders.

2. The document security method according to claim 1, wherein the main section comprises a document ID and a machine-readable code at an end of the main section, wherein the machine-readable code is configured to instruct the scanner device to stop scanning.

3. The document security method of claim 2, wherein the document data and the document ID are in a human-readable-machine-readable format.

4. The document security method of claim 2, wherein the paper document has a front face and a rear face, wherein the document data, the document ID, and the document private key are printed on the front face, wherein the method further comprises:

folding, in a sealable and tamper-proof manner, the paper document about the front face so that the front face is not visible.

5. The document security method of claim 2, wherein the scanner device comprises a Document-Casting Automated Teller Machine (ATM).

6. The document security method of claim 1, wherein the shreddable section is configured to be cut away from the paper document.

7. The document security method of claim 1, wherein the paper document is a ballot.

8. The document security method of claim 1, wherein the document private key is printed as a Quick Response (QR) code.

9. The document security method of claim 1, wherein the document private key is in a non-human readable machine-readable format.

10. The document security method of claim 1, wherein the unsigned datafile is an image of the main section.

11. The document security method of claim 1, wherein the unsigned datafile comprises information read from the main section using optical character recognition and optical mark recognition technologies.

12. The document security method of claim 1, wherein the method further comprises:

upon reading the document private key, shredding the shreddable section of the paper document to destroy the document private key.

13. The document security method of claim 1, wherein the method further comprises:

scanning and reading the main section of the paper document, by a scanner device to generate an unsigned datafile; and digitally signing the unsigned datafile using a scanner private key of a scanner public and private key pair associated with the scanner device to generate a scanner-signed datafile.

14. The document security method of claim 1, wherein the method further comprises:

scanning and reading the main section of the paper document, by a scanner device to generate an unsigned datafile;

digitally signing the unsigned datafile using the document private key to generate a document-signed datafile; and digitally signing the document-signed datafile using a scanner private key of a scanner public and private key pair associated with the scanner device to generate a document-and-scanner-signed datafile.

15. The document method of claim 13, wherein the method further comprises:

encrypting the scanner-signed data file using a cryptographic puzzle for each scanner signed data file to generate an encrypted-scanner-signed datafile, wherein the cryptographic puzzle is created by a unique cryptographic puzzle key created by cryptographic algorithms on the scanner device.

16. A document security method comprising:

printing a paper document, wherein the paper document comprises:

a main section and a shreddable section, the main section comprises a document data, and the shreddable section comprises a document private key of a document public and private key pair;

scanning and reading the main section of the paper document, by a scanner device to generate an unsigned datafile;

upon scanning the main section, reading by the scanner device, the document private key from the shreddable section;

digitally signing the unsigned datafile using the document private key to generate a document-signed datafile;

digitally signing the document-signed datafile using a scanner private key of a scanner public and private key pair associated with the scanner device to generate a document-and-scanner-signed datafile;

encrypting the document-and-scanner-signed datafile using a cryptographic puzzle for the document-and-scanner-signed datafile to generate an encrypted-document-and-scanner-signed datafile, wherein the cryptographic puzzle is created by a unique cryptographic puzzle key created by cryptographic algorithms on the scanner device;

receiving the encrypted-document-and-scanner-signed datafile by a blockchain database server;

solving, by the blockchain database server, the cryptographic puzzle used to encrypt the encrypted-document-and-scanner signed datafile;

upon solving, decrypting the encrypted-document-and-scanner-signed datafile; and upon decrypting, verifying the signatures on the document-and-scanner-signed datafile using a document public key of the document public and private key pair and a scanner public key of the scanner public and private key pair, wherein the document public key and the scanner public key are pre-published.

17. The document security method of claim 16, wherein the method further comprises:

upon verification, storing the encrypted-document-and-scanner-signed datafile or the decrypted-document-and-scanner-signed datafile in a blockchain database.

18. The document security method of claim 17, wherein the blockchain database is configured to allow keyword-based searches of the stored encrypted-document-and-scanner-signed datafile or the decrypted-document-and-scanner-signed datafile using the respective document ID, wherein the method further comprises:

searching the stored encrypted-document-and-scanner-signed datafile or the decrypted-document-and-scanner-signed datafile in the blockchain database using the respective document ID.

19. The document security method of claim 16, wherein the method further comprises:

upon verification, storing the encrypted-document-and-scanner-signed datafile or the decrypted-document-and-scanner-signed datafile in a plurality of blockchain databases, wherein the plurality of blockchain databases is operated independently by a plurality of competing stakeholder using a plurality of blockchain database servers.

20. The document security method of claim 19, wherein the method further comprises:
verifying an integrity of the stored encrypted-document-and-scanner-signed datafile or the decrypted-document-and-scanner-signed datafile among the plurality of blockchain databases.

21. The document security method of claim 16, wherein the method further comprises:
storing the encrypted-document-and-scanner-signed datafile or the decrypted-document-and-scanner-signed datafile in a layer-2 sidechain database of a blockchain database.

22. The document security method of claim 16, wherein the method further comprises:
saving the encrypted-document-and-scanner-signed datafile or the decrypted-encrypted-document-and-scanner-signed datafile as a non-fungible token (NFT) linked to a blockchain database or a layer-2 sidechain database of a blockchain database.

23. A document security method comprising:
printing a paper document, wherein the paper document comprises:
    a main section and a shreddable section,
    the main section comprises a document data, and
    the shreddable section comprises a document private key of a document public and private key pair;
scanning and reading the main section of the paper document, by a scanner device to generate an unsigned datafile;
upon scanning the main section, reading by the scanner device, the document private key from the shreddable section;
digitally signing the unsigned datafile using the document private key to generate a document-signed datafile;
encrypting the document-signed datafile using a cryptographic puzzle for the document-signed datafile to generate an encrypted-document-signed datafile, wherein the cryptographic puzzle is created by a unique cryptographic puzzle key created by cryptographic algorithms on the scanner device;
receiving the encrypted-document-signed datafile by a blockchain database server;
solving, by the blockchain database server, the cryptographic puzzle used to encrypt the document-signed datafile;
upon solving, decrypting the encrypted-document-signed datafile; and
upon decrypting, verifying the signature of the document-signed datafile using a document public key of the document public and private key pair, wherein the document public key is pre-published.

* * * * *